United States Patent
Nayak et al.

(10) Patent No.: US 9,251,254 B2
(45) Date of Patent: Feb. 2, 2016

(54) CONTROLLING THE EXECUTION SPEED OF A PROCESSOR IN AN AUDIO PROCESSING SYSTEM

(71) Applicant: QUALCOMM Incorporated, San Diego, CA (US)

(72) Inventors: Vasudev S. Nayak, San Diego, CA (US); Matthew C. Millward, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 13/967,273

(22) Filed: Aug. 14, 2013

(65) Prior Publication Data

US 2014/0180458 A1    Jun. 26, 2014

Related U.S. Application Data

(60) Provisional application No. 61/745,469, filed on Dec. 21, 2012.

(51) Int. Cl.
| | |
|---|---|
| *G06F 17/00* | (2006.01) |
| *G06F 17/30* | (2006.01) |
| *H04N 21/414* | (2011.01) |
| *H04N 21/442* | (2011.01) |
| *H04N 21/81* | (2011.01) |
| *G10L 19/22* | (2013.01) |

(52) U.S. Cl.
CPC ............ *G06F 17/3074* (2013.01); *G10L 19/22* (2013.01); *H04N 21/41407* (2013.01); *H04N 21/4424* (2013.01); *H04N 21/8106* (2013.01)

(58) Field of Classification Search
CPC . G06F 13/00; G06F 2209/509; G06F 9/5044; G06F 9/5083; G10H 2203/041
See application file for complete search history.

(56) References Cited

U.S. PATENT DOCUMENTS

| | | | | |
|---|---|---|---|---|
| 6,301,603 | B1 * | 10/2001 | Maher et al. | 718/105 |
| 2005/0011341 | A1 * | 1/2005 | Petef | 84/622 |
| 2005/0278168 | A1 * | 12/2005 | Liu et al. | 704/221 |
| 2013/0060978 | A1 * | 3/2013 | Amann et al. | 710/104 |

* cited by examiner

*Primary Examiner* — Andrew C Flanders
(74) *Attorney, Agent, or Firm* — Shumaker & Sieffert, P.A.

(57) ABSTRACT

This disclosure is directed to techniques for controlling the execution speed of a processor that executes audio processing algorithms. In some examples, the execution speed of the processor may be controlled based on one or more delay parameters that are obtained from querying one or more tasks that execute the audio processing algorithms. The delay parameters that are returned by the tasks in response to the queries may, in some examples, be dependent upon one or more algorithm-specific parameters that are used to configure the audio processing algorithms. The techniques of this disclosure may be used to reduce the amount of power consumed by a processor that is configured to execute one or more audio processing algorithms in an audio communication device, which may be particularly useful in audio communication devices where power resources are limited, such as, e.g., a mobile phone.

46 Claims, 18 Drawing Sheets

| | 1 | 2 | 3 | 4 | 5 | 6 | 7 | Device | Function |
|---|---|---|---|---|---|---|---|---|---|
| e) | X | X | X | X | X | X | Encoder | Bluetooth Headset | Headset + Voice Call |
| f) | | | Single mic EC | X | X | X | Encoder | Bluetooth with single mic EC | Headset + Voice Call |
| g) | | | ANC one mic | | | | Encoder | Headset Wireless | Headset + Voice Call |
| h) | | | ANC 4 mic's | | | | Encoder | Headset Wired | Headset + Voice Call |

(f row annotation: Different Parameter Configuration)

FIG. 5

Exemplary Receive Side Topologies

| | 1 | 2 | 3 | 4 | 5 |
|---|---|---|---|---|---|
| a) | MBDRC | PBE | Limiter | Speaker Protection | Decoder |
| b) | MBDRC | X | Limiter | Speaker Protection | Decoder |
| c) | X | PBE | X | X | Decoder |
| d) | MBDRC | X | X | X | Decoder |
| e) | X | PBE | | Speaker Protection | Decoder |

| | 1 | 2 | 3 | 4 | 5 | 6 | 7 | 8 | 9 | 10 |
|---|---|---|---|---|---|---|---|---|---|---|
| f) | Decoder | NS | AIG | DRC | IIR | AVC | PBE | MBDRC | Limiter | Speaker Protection |

*FIG. 6*

Method 3

Algorithm-specific images

CONTROLLING THE EXECUTION SPEED OF A PROCESSOR IN AN AUDIO PROCESSING SYSTEM

This application claims the benefit of U.S. Provisional Application No. 61/745,469, filed Dec. 21, 2012.

TECHNICAL FIELD

This disclosure relates to audio communication devices, and more particularly, to techniques for controlling the execution speed of a processor in an audio communication device.

BACKGROUND

Audio communication devices are used to provide one-way and/or two-way communication between two different devices over a communication channel. Audio communication devices may include devices such as, e.g., wireless communication devices, wired communication devices, voice communication devices, mobile telephones, mobile telephone handsets, mobile telephone headsets, Bluetooth devices, tablet personal computers, tablet phones, landline telephones, Internet telephones, personal digital assistants (PDAs), smartphones, etc.

In order to effectively transmit and receive audio data between two different devices and in order to improve the quality of the communication experience, an audio communication device may include one or more processors that are configured to process digital audio waveforms using one or more digital signal processing (DSP) algorithms. For real-time communication applications, the DSP algorithms may need to perform many calculations in a relatively short period of time. To ensure that there are sufficient processing resources to perform the number of calculations needed in the required amount of time, the one or more processors may need to be clocked at a relatively high rate, which may consume a significant amount of power.

SUMMARY

This disclosure is directed to techniques for controlling the execution speed of a processor that executes audio processing algorithms. In some examples, the techniques for controlling the execution speed of the processor may control the execution speed based on one or more algorithm-specific parameters that are used to configure one or more of audio processing algorithms in a topology. For example, the execution speed of the processor may be controlled based on one or more delay parameters that are obtained from querying one or more tasks that execute the audio processing algorithms in the topology. The delay parameters that are returned by the tasks in response to the queries may, in some examples, be dependent upon one or more algorithm-specific parameters that are used to configure the audio processing algorithms. As another example, the execution speed of the processor may be controlled based on a total processing delay that is determined based on one or more algorithm-specific parameters that are indicative of whether one or more of the audio processing algorithms in the topology are enabled or disabled for the topology.

Using algorithm-specific parameters to control the execution speed of the processor may allow the execution speed to be reduced for topology configurations that do not require as much processing speed. Reducing the execution speed of the processor may reduce the overall power consumed by the audio processing system relative to audio processing systems that merely utilize a worst case processing speed associated with a worst case topology configuration. In this way, a relatively power efficient audio processing system that is capable of dynamically switching audio processing topologies and/or topology configurations may be achieved.

In one example, this disclosure describes a method that includes determining, with one or more processors, a processor execution speed for executing one or more audio processing algorithms of a topology based on one or more algorithm-specific parameter values. The one or more audio processing algorithms are configured according to the one or more algorithm-specific parameter values. The method further includes executing, with the one or more processors, the one or more audio processing algorithms of the topology based on the determined processor execution speed.

In another example, this disclosure describes a device that includes one or more processors configured to determine a processor execution speed for executing one or more audio processing algorithms of a topology based on one or more algorithm-specific parameter values. The one or more audio processing algorithms are configured according to the one or more algorithm-specific parameter values. The one or more processors are further configured to execute the one or more audio processing algorithms of the topology based on the determined processor execution speed.

In another example, this disclosure describes an apparatus that includes means for determining a processor execution speed for executing one or more audio processing algorithms of a topology based on one or more algorithm-specific parameter values. The one or more audio processing algorithms are configured according to the one or more algorithm-specific parameter values. The apparatus further includes means for executing the one or more audio processing algorithms of the topology based on the determined processor execution speed.

In another example, this disclosure describes a computer-readable storage medium storing instructions that, when executed, cause one or more processors to determine a processor execution speed for executing one or more audio processing algorithms of a topology based on one or more algorithm-specific parameter values. The one or more audio processing algorithms are configured according to the one or more algorithm-specific parameter values. The instructions further cause the one or more processors to execute the one or more audio processing algorithms of the topology based on the determined processor execution speed.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 4 and 5 are conceptual diagrams illustrating example transmit side topologies in accordance with this disclosure.

FIG. 6 is a conceptual diagram illustrating example receive side topologies in accordance with this disclosure.

DETAILED DESCRIPTION

Figure 1:
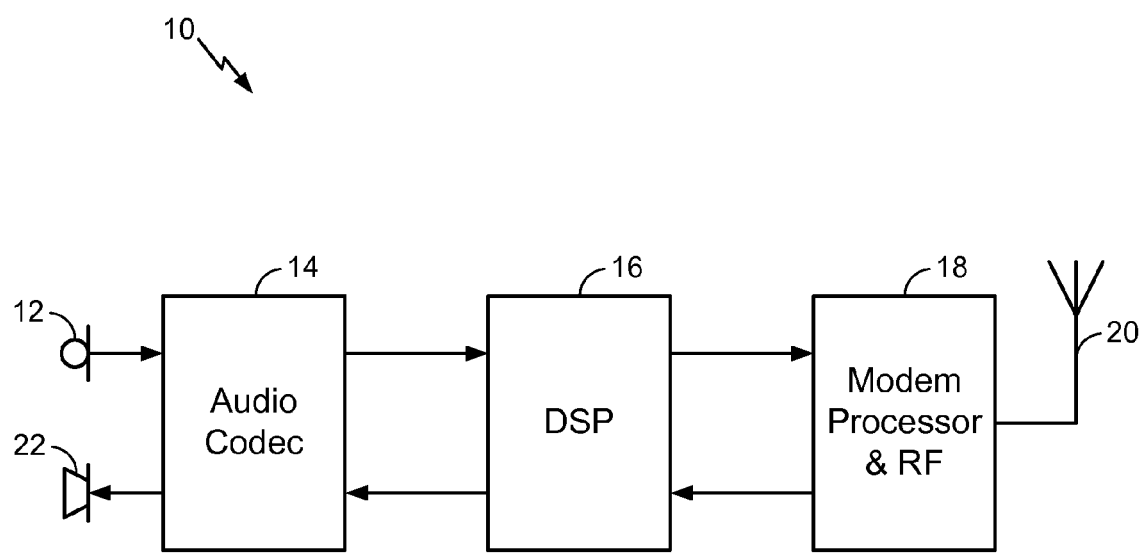
FIG. 1 is a block diagram illustrating an example audio communication device that may be used to implement the processor execution speed control techniques of this disclosure.

This disclosure is directed to techniques for controlling the execution speed of a processor in an audio communication device. In some examples, the techniques of this disclosure may include controlling the execution speed of a processor that is configured to execute one or more audio processing algorithms based on one or more parameters that are indicative of one or more delays associated with executing the one or more audio processing algorithms on the processor. The techniques of this disclosure may be used to reduce the amount of power consumed by a processor that is configured to execute one or more audio processing algorithms in an audio communication device, which may be particularly useful in audio communication devices where power resources are limited, such as, e.g., a mobile phone.

To ensure real-time communications, a processor that executes audio processing algorithms in an audio communication device may need to execute a sufficient number of instructions in a given unit of time so that all audio processing algorithms may be completed in a threshold period of time. Different combinations of audio processing algorithms, however, may require different amounts of processing instructions to be performed in a given unit of time in order to provide real-time audio communication. Moreover, the amount of processing instructions that need to be performed in a given unit of time for particular audio processing algorithms may vary based on the particular calibrations of the audio processing algorithms.

One approach for controlling the execution speed of a processor that executes audio processing algorithms in an audio communication device is to calculate a worst case processing delay based on a worst case combination of audio processing algorithms that could potentially be executed on the processor for a given communication session and based on a worst case calibration of each of the audio processing algorithms. The execution speed of the processor may be set based on the worst case processing delay such that there is a sufficient amount of processing resources (e.g., instructions per given unit of time) available to execute the worst case combination of audio processing algorithms within a threshold amount of time required for real-time communications.

One drawback of this approach, however, is that other combinations of algorithms and/or other calibrations of algorithms may not require as many processing resources in order to meet the threshold amount of time required for real-time communications. If the worst case combination and calibration of algorithms is not used for a particular audio communication session, then the processor that executes the audio processing algorithms may be clocked at a rate that is higher than what is necessary for the particular combination and calibration of algorithms. Clocking the processor at a higher rate than what is necessary for a given combination and calibration of algorithms may be power inefficient.

In some examples, the techniques of this disclosure may control the execution speed of a processor for a communication session based on a combination of audio processing algorithms that are actually used during a communication session. For example, a first processor may determine a combination of audio processing algorithms that are to be executed by a second processor during a communication session, and determine a processor execution speed for a second processor based on the combination of audio processing algorithms. The first processor may be the same as or different than the second processor. In some cases, the first processor may determine the processor execution speed for the second processor based on one or more parameters that are indicative of one or more delays associated with executing the combination of audio processing algorithms.

By controlling the execution speed of a processor based on a combination of audio processing algorithms that are actually used during a communication session, as opposed to merely using a theoretical worst case combination of audio processing algorithms, the clock rate of the processor that executes the audio processing algorithms may be reduced in cases where the worst case combination of audio processing algorithms is not used for an audio communication session. In this manner, the power consumed by the audio communication device may be reduced.

In further examples, the techniques of this disclosure may control the execution speed of a processor for a communication session based on a calibration for one or more audio processing algorithms that is actually used during the communication session. For example, a first processor may determine one or more parameters that are indicative of a calibration that is to be used during a communication session for one or more audio processing algorithms that are to be executed by a second processor during the communication session, and determine a processor execution speed for the second processor based on the one or more parameters that are indicative of the calibration that is to be used during the communication session. The first processor may be the same as or different than the second processor.

By controlling the execution speed of a processor based on a calibration for one or more audio processing algorithms that is actually used during a communication session, as opposed to merely using a theoretical worst case calibration of one or more audio processing algorithms, the clock rate of the processor that executes the audio processing algorithms may be reduced in cases where the worst case calibration of audio processing algorithms is not used for an audio communication session. In this manner, the power consumed by the audio communication device may be reduced.

In additional examples, the techniques of this disclosure may control the execution speed of a processor for a communication session based on a calibration for a combination of audio processing algorithms that are actually used during the communication session. For example, a first processor may determine a combination of audio processing algorithms that are to be executed by a second processor during a communication session, determine one or more parameters that are indicative of a calibration that is to be used during the communication session for the combination of audio processing algorithms that are to be executed by the second processor during the communication session, and determine a processor execution speed for a second processor based on the combination of audio processing algorithms and the one or more parameters that are indicative of a calibration that is to be used during the communication session. The first processor may be the same as or different than the second processor.

By controlling the execution speed of a processor based on a combination of audio processing algorithms that are actually used during a communication session and based on a calibration for the combination of algorithms that are actually used during the communication session, as opposed to merely using a theoretical worst case combination and calibration of audio processing algorithms, the clock rate of the processor that executes the audio processing algorithms may be reduced in cases where the worst case combination and calibration of audio processing algorithms is not used for an audio communication session. In this manner, the power consumed by the audio communication device may be reduced.

In further examples, the techniques of this disclosure may control the execution speed of a processor for a communication session based on algorithm-specific parameters that are indicative of one or more algorithm-specific delays associated with a combination of audio processing algorithms to be executed during the communication session. For example, a first processor may determine one or more algorithm-specific parameters that are indicative of one or more algorithm-specific delays associated with a combination of audio processing algorithms to be executed during the communication session, and determine a processor execution speed for a second processor based on the algorithm-specific parameters that are indicative of one or more algorithm-specific delays associated with the combination of audio processing algorithms to be executed during the communication session. The first processor may be the same as or different than the second processor.

By controlling the execution speed of a processor based on algorithm-specific parameters for a combination of audio processing algorithms to be executed during a communication session, as opposed to merely using topology-wide parameters (e.g., parameters that are indicative of a worst case delay for an entire topology (e.g., a combination of algorithms) rather than for individual algorithms within the topology), the clock rate of the processor that executes the audio processing algorithms may be reduced in cases where the worst case topology configuration is not used for an audio communication session. In this manner, the power consumed by the audio communication device may be reduced.

In additional examples, the techniques of this disclosure may control the execution speed of a processor for a communication session based on one or more delay parameters provided by one or more tasks that perform audio processing algorithms. For example, a first processor may receive, from each of one or more tasks that perform an audio processing algorithm, one or more parameters indicative of one or more algorithm-specific delays for the algorithm performed by respective task. In this example, the first processor may determine a processor execution speed for a second processor based on the one or more parameters provided by each of the tasks. The first processor may be the same as or different than the second processor.

Traditionally, there was no interface that required an audio processing task to provide algorithm-specific delay parameters for the particular audio processing algorithm performed by the task to other processing tasks in the system. Because of the large number of algorithms and possible calibrations for each algorithm, maintaining a centralized database of the delays associated with all possible algorithms and all possible calibrations would be difficult and expensive, if even possible. As such, algorithm-specific delay parameters were typically not available to clock rate managers in traditional audio communications devices.

In some examples, the techniques of this disclosure may provide an interface that allows algorithm-specific delay parameters for a first task that performs an audio processing algorithm to be obtained from a first task by a second task executing in an audio processing system. For example, the interface may allow the second task to query the first task for one or more parameters indicative of one or more delays associated with the audio processing algorithm performed by the first task. The interface may allow the first task to output the one or more parameters to the second task in response to a query received by the second task.

In additional examples, an audio processing task may be configured to output one or more parameters that are indicative of one or more delays for an audio processing algorithm performed by the task. In some examples, the one or more parameters may include one or more parameters indicative of an algorithm delay for the audio processing algorithm performed by the task as described in further detail later in this disclosure. In additional examples, the one or more parameters may include one or more parameters indicative of a processing delay for the audio processing algorithm performed by the task as described in further detail later in this disclosure. In some examples, the task may be configured to generate one or more of the delay parameters based on values of one or more calibration parameters that are to be used during a communication session.

Providing an interface that allows tasks to obtain delay parameters from audio processing tasks executing in an audio processing system may allow a centralized clock rate manager to have access to algorithm-specific delay parameters as well as to algorithm-specific and calibration-specific delay parameters. In this manner, the clock rate manager may control the execution speed of a processor that executes audio processing algorithms based on algorithm-specific and/or calibration-specific parameters.

In some examples, a combination of algorithms, as used herein, may refer to a topology. A topology may refer to a sequence of one or more audio processing algorithms that are executed during an audio communication session. In some cases, the topology may define an order for executing the sequence of audio processing algorithms.

As used herein, a task may refer to self-contained, self-describing code that performs one or more functions. An audio processing task may perform one or more audio processing algorithms. A manager task (e.g., a voice processing manager) may control the execution speed of a processor that executes audio processing tasks. Tasks may be alternatively referred to herein as modules, execution modules, code units, blocks, processing blocks, software code, instructions, etc.

FIG. 1 is a block diagram illustrating an example audio communication device 10 that may be used to implement the processor execution speed control techniques of this disclosure. Audio communication device 10 may be, e.g., a wireless communication device, a voice communication device, a mobile telephone, a mobile phone handset, a mobile telephone headset, a Bluetooth device, a tablet personal computer, a tablet phone, an Internet telephone, a personal digital assistant (PDA), a smartphone, etc.

As shown in FIG. 1, audio communication device 10 includes a microphone 12, an audio codec 14, a digital signal processor (DSP) 16, a modem processor and radio frequency transceiver (RF) 18 (hereinafter referred to as "modem processor 18"), an antenna 20, and a speaker 22. Microphone 12 may include one or more microphones, and speaker 22 may include one or more speakers.

To transmit audio data to another device over a communication channel, microphone 12 may sense a sound source (e.g., a human voice) and generate an analog, electrical audio waveform based on the sensed sound source. Audio codec 14 may include an analog-to-digital converter (ADC) that converts the analog audio waveform to a digital audio waveform. DSP 16 may include a real time processor that processes the digital audio waveform using one or more digital signal pre-processing algorithms, and an encoder to compress the processed digital audio waveform to form packets. Modem processor 18 may modulate the packets onto one or more carriers for transmission over a communication channel using antenna 20. In some examples, modem processor 18 may transmit the packets over an air channel to a base station.

To receive and output audio data from another device, modem processor 18 may demodulate a signal received via antenna 20 to generate one or more received packets. DSP 16 may include a decoder that decompresses the packets into a synthetic digital audio waveform. The real time processor in DSP 16 may process the synthetic digital audio waveform using one or more digital signal post-processing algorithms. Audio codec 14 may include a digital-to-analog converter (DAC) that converts the post-processed digital audio waveform to an analog audio waveform. Speaker 22 may generate and output a sound waveform based on the analog, electrical audio waveform.

As shown in FIG. 1, on the uplink (i.e., from the microphone to a base station on a near end device), audio data is sampled from the analog speech signal received at the microphone 12 input by audio codec 14. These samples are transferred to DSP 16 for pre-processing, such as, e.g., echo cancellation, noise suppression etc. The processed samples are then transferred to a voice encoder in DSP 16. The encoder may compress the speech samples for efficient transmission over the air. The packets are then transferred to modem processor 18. Modem processor 18 may apply appropriate headers as per the standard protocol and transmit the packets to the base station.

On the downlink (i.e., from the base station to a speaker on a far end device), modem processor 18 receives the packet from the base station and formats it to suit the voice decoder in DSP 16. The decoder decodes the packet and sends the speech samples for post processing in DSP 16. After post processing, the samples are sent to the DAC in audio codec 14 for playing out on the selected device.

Latency considerations for the data flow shown in FIG. 1 will now be described. The latencies involved in an end-to-end voice call in the above system can be broadly categorized into the following categories: (1) buffering latencies; (2) algorithm latencies; (3) processing latencies; and (4) transfer latencies.

For buffering latencies, most algorithms operate in frame sizes. For example, an Adaptive Multi-Rate Narrowband (AMR-NB) vocoder in a Global System for Mobile Communications (GSM) call operates on 20 milliseconds (ms) frame size. This implies that 20 ms of time is needed to buffer the samples before the encoder can process the samples. In some examples, the buffering latencies may be dependent on the frame size requirements for a framework. In further examples, the buffering latencies may be dependent on the framework in general. In additional examples, the buffering latencies may be independent of the particular algorithms in a topology and/or of the calibrations used for the algorithms in a topology.

For algorithm latencies, each processing algorithm and the vocoder may have internal latencies that are required for their performance. For example, an AMR-NB encoder may have, in some examples, a 5 ms of algorithm latency. This is generally considered part of the algorithm rather than as a buffering latency, as these can differ even if the frame sizes are the same.

In general, an algorithm may have its own buffers, and may handle any buffering that it needs to do internally. The amount of algorithm buffering may be more than, less than, or the same as the amount of frame size buffering. In some examples, the algorithm buffering may correspond to look-ahead buffering. In further examples, the algorithm latencies are dependent on the particular algorithm to be used and/or on the particular calibration parameters that are used for the algorithm. In additional examples, the algorithm latencies may be independent of the millions of instructions per second (MIPS) requirements of the algorithm and/or independent of the processor speed used to execute the algorithm.

For processing latencies, depending on the MIPS requirements of the algorithm, it may take some amount of time for the algorithm to execute on a processor. Although the MIPS requirements are described in terms of 1 second of real time, the actual algorithm may run periodically based on the frame size in order to reduce the buffering latency. For example, an algorithm of 20 ms frame size may run every 20 ms. If the MIPS of the algorithm is 50 MIPS and the CPU is 100 MHz, then this algorithm may take 10 ms to execute. In some examples, the processing latencies may be dependent on the MIPS requirements of the algorithm and/or dependent on the processor speed used to execute the algorithm.

Transfer latencies may include the latency incurred when transferring packets between different subsystems and processors. For example, transferring to/from base station and processing within the base station also incurs latency.

The algorithm latencies and the processing latencies are more likely to be different for each topology based on which algorithms are enabled. System design is often consistent across different topologies. If the buffering latencies are substantially different, this may be because of the system behavior. For example, a Bluetooth (BT) headset may have a larger latency than a wired headset due to the latencies of the BT protocol. In some examples, the techniques of this disclosure may optimize algorithm latencies and processing latencies.

In some examples, one or more of the processor execution speed control techniques of this disclosure may be implemented in DSP 16 of audio communication device 10.

Figure 2:
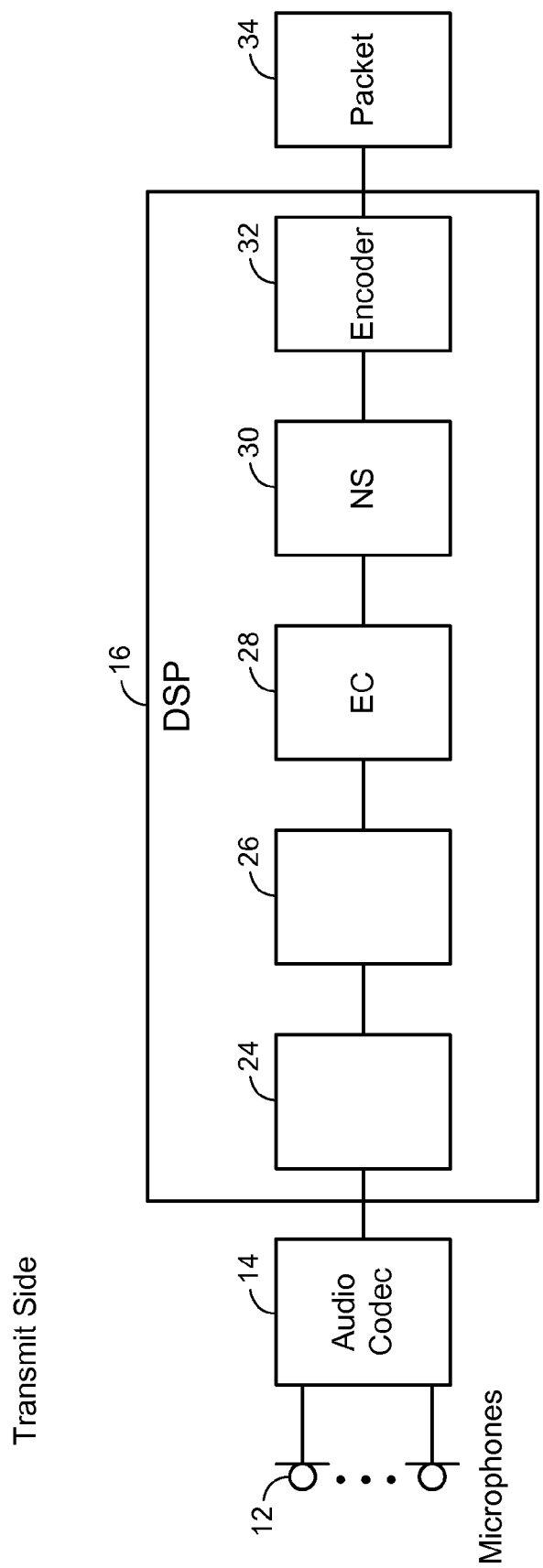
FIG. 2 is a block diagram illustrating an example transmit side architecture of the digital signal processor (DSP) shown in FIG. 1 in accordance with this disclosure.

FIG. 2 is a block diagram illustrating an example transmit side architecture of DSP 16 shown in FIG. 1 in accordance with this disclosure. As shown in FIG. 2, for the transmit side, DSP 16 may execute a plurality of audio processing tasks represented by blocks 24, 26, 28, 30 and 32. Each audio processing task may perform one or more audio processing algorithms. For example, echo cancellation (EC) block 28 may perform an EC audio processing algorithm, noise suppression (NS) block 30 may perform a NS audio processing algorithm, and encoder block 32 may perform one or more encoding and/or compression algorithms to generate a packet 34. Blocks 24 and 26 may each perform one or more audio processing algorithms (unspecified in FIG. 2). The sequence of audio processing algorithms performed for a particular communication session may be configurable. The sequence of algorithms that is loaded and performed for a particular communication session may be referred to as a topology.

Figure 3:
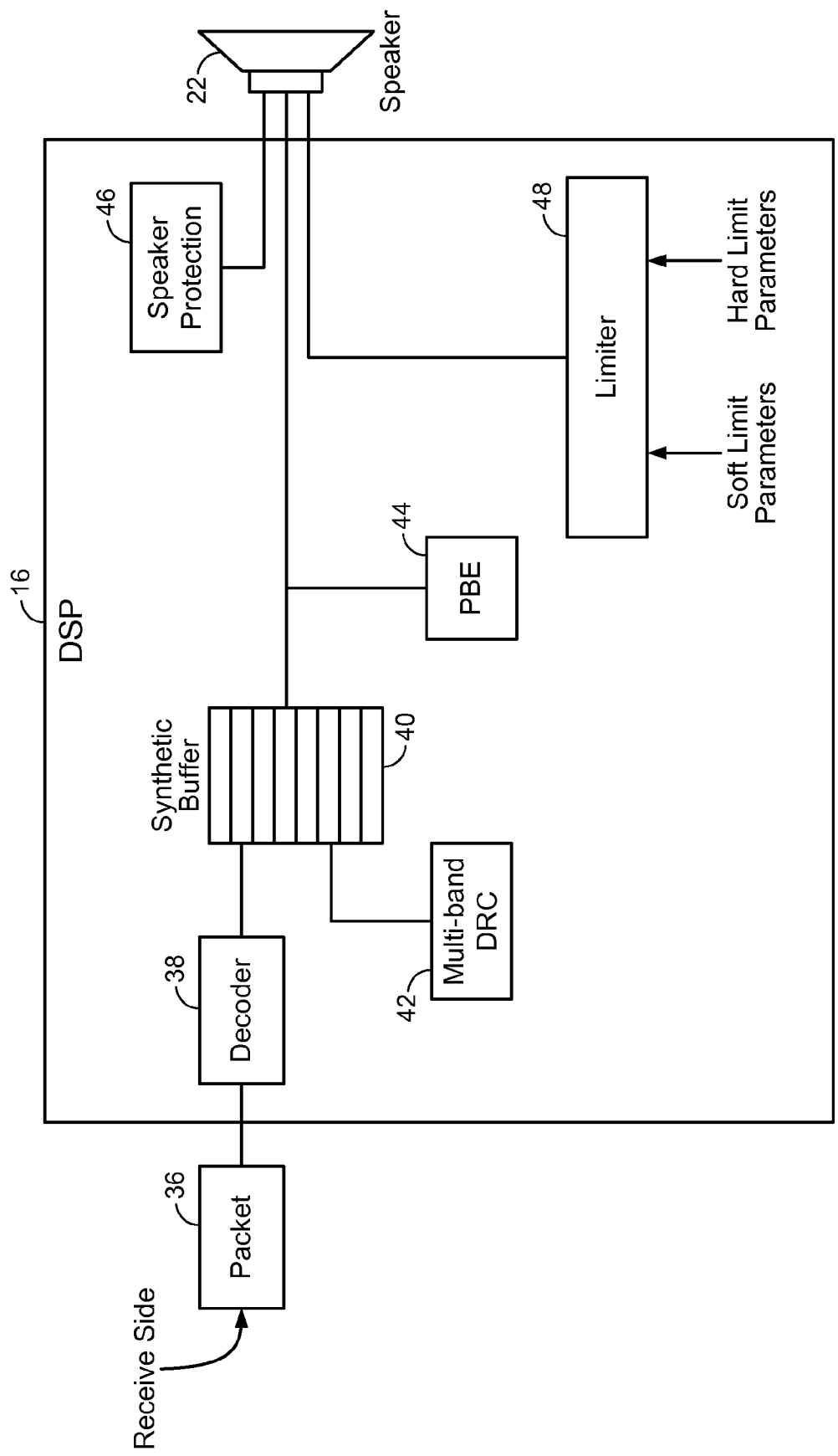
FIG. 3 is a block diagram illustrating an example receive side architecture of the DSP shown in FIG. 1 in accordance with this disclosure.

FIG. 3 is a block diagram illustrating an example receive side architecture of DSP 16 shown in FIG. 1 in accordance with this disclosure. As shown in FIG. 3, for the receive side, DSP 16 executes a plurality of audio processing tasks represented by blocks 38, 42, 44, 46 and 48. Decoder 38 may receive packet 36 and generate a synthetic waveform for storage in synthetic buffer 40, dynamic range control (DRC) block 42 may perform a DRC audio processing algorithm, psycho acoustic base element (PBE) block 44 may perform a PBE audio processing algorithm, speaker protection block 46 may perform a speaker protection audio processing algorithm, and limiter block 48 may perform a limiting audio processing algorithm. In some examples, limiter block 48 may perform the limiting audio processing algorithm based on one or more soft limit parameters and one or more hard limit parameters. Similar to the transmit side, the sequence of audio processing algorithms performed for a particular communication session may be configurable. The sequence of algorithms that is loaded and performed for a particular communication session may be referred to as a topology.

Although not explicitly shown in FIG. 3, DSP 16 may, in some examples, also execute an EC audio processing algorithm and an automatic volume control (AVC) audio processing algorithm. In such examples, there may be a connection from the EC block to the AVC block. In such examples, there may also be a connection from the output of the decoder chain to a reference port of the EC block.

Figure 4:

FIGS. 4 and 5 are conceptual diagrams illustrating example transmit side topologies in accordance with this disclosure. Each topology may be associated with a particular device and function configuration. For example, topology (a) is associated with a handset device with one microphone using a voice call function, topology (b) is associated with a handset device with a dual microphone using a voice call function plus a speakerphone function, topology (c) is associated with a handset device with a quad microphone using a voice call function plus a browse talk speakerphone function, topology (d) is associated with a tablet device using a voice call function, topology (e) is associated with a Bluetooth headset device using a headset function plus a voice call function, topology (f) is associated with a Bluetooth device with a single microphone echo canceller using a headset function plus a voice call function, topology (g) is associated with a wireless headset device using a headset function plus a voice call function, and topology (h) is associated with a wired headset device using a headset function plus a voice call function.

Each topology may include a sequence of audio processing algorithm slots (referred to as "processing slots") (7 processing slots numbered 1-7 in this example), each of which may represent an audio processing task that is configured to perform an audio processing algorithm. Each of the processing slots may be enabled or disabled. When enabled, a task may be executed that may perform an audio processing algorithm that is assigned to the processing slot by the topology. When disabled, a task corresponding to the audio processing algorithm that is assigned to the processing slot by the topology is not executed. The encoder in processing slot (7) may be enabled for all topologies.

For topologies (a), (b), (c), and (d), processing slot 1 includes an infinite impulse response filtering (IIR) audio processing algorithm, processing slot 2 includes a gain adjustment audio processing algorithm, processing slot 3 includes an EC audio processing algorithm, processing slot 4 includes an NS audio processing algorithm, processing slot 5 includes an Adaptive Input Gain (AIG) audio processing algorithm, processing slot 6 includes a DRC audio processing algorithm, and processing slot 7 includes an encoder audio processing algorithm. In some examples, an IIR audio processing algorithm may be performed after the EC and NS processing stages for the topologies shown in FIGS. 4 and 5.

With respect to processing slot 3 for topologies (a), (b), (c), and (d), topology (a) includes a single microphone EC audio processing algorithm, topology (b) includes a dual microphone EC audio processing algorithm, and topologies (c) and (d) include a quad microphone EC audio processing algorithm. The difference between topologies (c) and (d) is that the quad microphone EC audio processing algorithm in each of the topologies has a different parameter configuration.

For topology (e), processing slots (1)-(6) are disabled for the Bluetooth headset device. For topology (f), processing slots (1), (2) and (4)-(6) are disabled for the Bluetooth headset device with single microphone EC. A single microphone EC algorithm, however, is enabled for processing slot 3. The single microphone EC may have different parameter configurations.

For topology (g), processing slots (1)-(3), (5) and (6) are disabled for the wireless headset device. However, processing slot (4) is enabled with a single microphone active noise control (ANC) audio processing algorithm. Topology (h) is similar to topology (g) except that the single microphone ANC audio processing algorithm is replaced by a quad microphone ANC algorithm for the wired headset device.

It should be noted that some algorithms may have different parameter configurations based on different sampling frequencies. For example, if the device is in a circuit switched network, the sampling frequency may be, e.g., $f_{S1}$=8 KHz or $f_{S2}$=16 KHz. As another example, if the device is in a Voice over IP (VoIP) network, the sampling frequency may be, e.g., $f_S$=48 KHz.

FIG. 6 is a conceptual diagram illustrating example receive side topologies in accordance with this disclosure. In some examples, each topology may be associated with a particular device and function configuration. Each topology may include a sequence of audio processing algorithm slots (referred to as "processing slots") (5 processing slots numbered 1-5 for topologies (a)-(e) and 7 processing slots numbered 1-7 for topology (f)), each of which may represent an audio processing task that is configured to perform an audio processing algorithm. Each of the processing slots may be enabled or disabled. When enabled, a task may be executed that may perform an audio processing algorithm that is assigned to the processing slot by the topology. When disabled, a task corresponding to the audio processing algorithm that is assigned to the processing slot by the topology is not executed. The decoder may be enabled for all topologies.

For topologies (a), (b), (c), (d), (e), processing slot 1 includes a multi-band DRC (MBDRC) audio processing algorithm, processing slot 2 includes a PBE audio processing algorithm, processing slot 3 includes a limiter audio processing algorithm, processing slot 4 includes a speaker protection audio processing algorithm, and processing slot 5 includes a decoder processing algorithm. For topology (a), all processing slots are enabled. For topology (b), processing slots (1) and (3)-(5) are enabled, and processing slot (2), which executes the PBE audio processing algorithm, is disabled. For topology (c), processing slots (2) and (5) are enabled, and processing slots (1), (3) and (4), which execute the MBDRC, the limiter, and the speaker protection audio processing algorithms, are disabled. For topology (d), processing slots (1) and (5) are enabled, and processing slots (2)-(4), which execute the PBC, the limiter, and the speaker protection audio processing algorithms, are disabled. For topology (e), processing slots (2), (4), and (5) are enabled, and processing slots (1) and (3), which execute the MBDRC and the limiter, are disabled.

For topology (f), processing slot 1 includes a decoder audio processing algorithm, processing slot 2 includes an NS audio processing algorithm, processing slot 3 includes an AIG audio processing algorithm, processing slot 4 includes a DRC audio processing algorithm, processing slot 5 includes an IIR audio processing algorithm, processing slot 6 includes an AVC audio processing algorithm, processing slot 7 includes a PBE audio processing algorithm, processing slot 8 includes an MBDRC audio processing algorithm, processing slot 9 includes a limiter audio processing algorithm, processing slot 10 includes a speaker protection audio processing algorithm.

Figure 7:
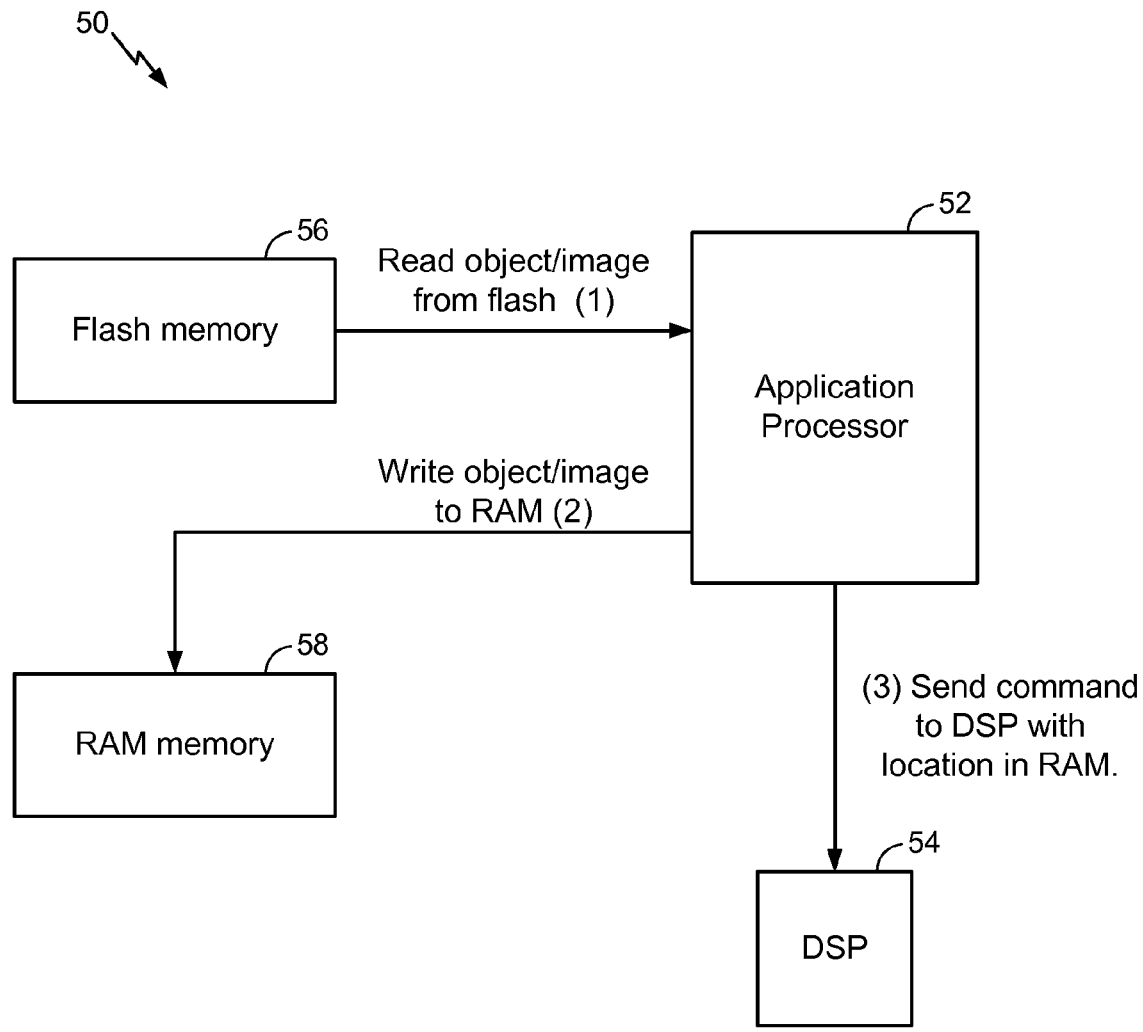
FIG. 7 is a block diagram illustrating an example audio processing system in which images may be loaded in accordance with this disclosure.

FIG. 7 is a block diagram illustrating an example audio processing system 50 in which images may be loaded in accordance with this disclosure. Audio processing system 50 includes an application processor 52, a DSP 54, a flash memory 56, and a RAM memory 58. RAM memory 58 may be alternatively referred to as an application processor RAM.

Application processor 52 may be a general-purpose application processor (e.g., a CPU) that controls DSP 54. In some examples, application processor 52 may be an ARM processor. Although DSP 54 is described as being a DSP, in some examples, DSP 54 may also be a general a general-purpose processor, a CPU, or another type of processor. Although application processor 52 and DSP 54 are illustrated as being separate processors, in some examples, the functionality of application processor 52 and DSP 54 may be implemented with a single processor.

For the loading of topologies, each device may, in some examples, require a new topology to be loaded and calibrated. This loading may be done either statically (boot time) or dynamically (run time). A static loading may involve a set of topologies pre-compiled as a static image or a pre-loaded dynamic object. Dynamic loading may involve a topology or a set of topologies that are loaded before a call starts. In either case, these modules may be enabled via calibration parameters received when the user selects a particular device (e.g., a handset). The image and/or object may be part of the flash that is either loaded when the DSP boots up or loaded by a service after the DSP boot up.

As shown in FIG. 7, to load an image or an object, application processor 52 may read an object or image from flash memory 56 (1), and write the object or image to RAM memory 58 (2). Application processor 52 may send a command to DSP 54 with the location of the object or image within RAM memory 58 (3). For static images the loading of images may occur at bootup (i.e., prior to runtime). For dynamic images, the loading of images may this may occur at run time. The topology information and calibration may be loaded on to DSP 16 based on an audio device selection.

Figure 8:
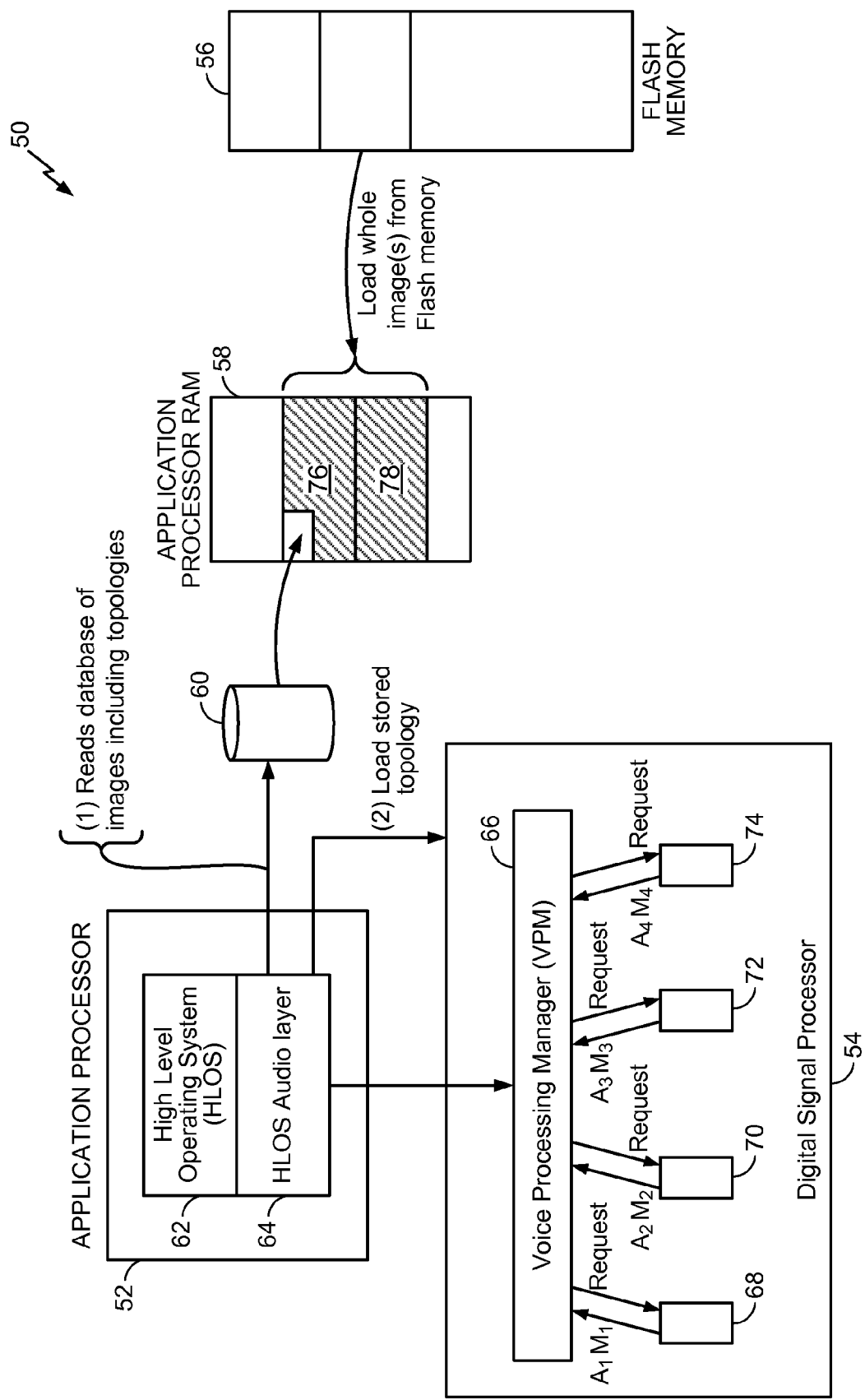
FIG. 8 is a block diagram illustrating the example audio processing system of FIG. 7 in further detail.

FIG. 8 is a block diagram illustrating the example audio processing system 50 of FIG. 7 in further detail. In addition to the components already discussed above with respect to FIG. 7, audio processing system 50 also includes a database of images 60, which may include topologies.

As shown in FIG. 8, application processor 52 includes a High Level Operating System (HLOS) 62, which includes an HLOS audio layer 64. DSP 54 includes a voice processing manager 66 and tasks 68, 70, 72, 74. RAM memory 58 includes images 76, 78, which may include one or more topologies.

HLOS audio layer 64 may cause one or more whole images to be loaded into RAM memory 58 from flash memory 56. HLOS audio layer 64 may read the database of images 60 to access one or more topologies in RAM memory 58. HLOS audio layer 64 may load a stored topology into DSP 54. The stored topology, in this example, may correspond to tasks 68, 70, 72, 74.

Each of tasks 68, 70, 72, 74 may provide to voice processing manager 66 one or more parameters indicative of a delay associated with executing an audio processing algorithm associated with the respective task. In this example, each of tasks 68, 70, 72, 74 provides a parameter indicative of the algorithm delay of the respective task ($A_1, A_2, A_3, A_4$) and a parameter indicative of the processing delay of the respective task ($M_1, M_2, M_3, M_4$) to voice processing manager 66. In some examples, each of tasks 68, 70, 72, 74 may provide one or both of the delay parameters to voice processing manager 66 in response to a receiving a request from voice processing manager 66 to return one or both of the parameters.

In some examples, voice processing manager 66 may call a Get Delay ( ) function that instructs a particular one of tasks 68, 70, 72, 74 to return an algorithm delay to voice processing manager 66 for an audio processing algorithm implemented by the respective one of tasks 68, 70, 72, 74. In further examples, voice processing manager 66 may call a Get MIPS ( ) function that instructs a particular one of tasks 68, 70, 72, 74 to return a processing delay to voice processing manager 66 for an audio processing algorithm implemented by the respective one of tasks 68, 70, 72, 74. In additional examples, each of tasks 68, 70, 72, 74 may be configured to return an algorithm delay in response to receiving the Get Delay ( ) query, and to return a processing delay in response to receiving the Get MIPS ( ) query. In some examples, the algorithm delay may be returned in units of time and the processing delay may be returned in units of instructions per second or MIPS.

In some examples, voice processing manager 66 may calculate a total delay based on the algorithm delay parameters and the processing delay parameters based on the following equation:

$$\text{Total} = \sum_{i=0}^{N} A_i + M_i$$

where Total represents the total delay for the topology, $A_i$ represents the algorithm delay for the ith algorithm, $M_i$ represents the processing delay for the ith algorithm, and N represents the number of tasks in the topology.

Figure 9:
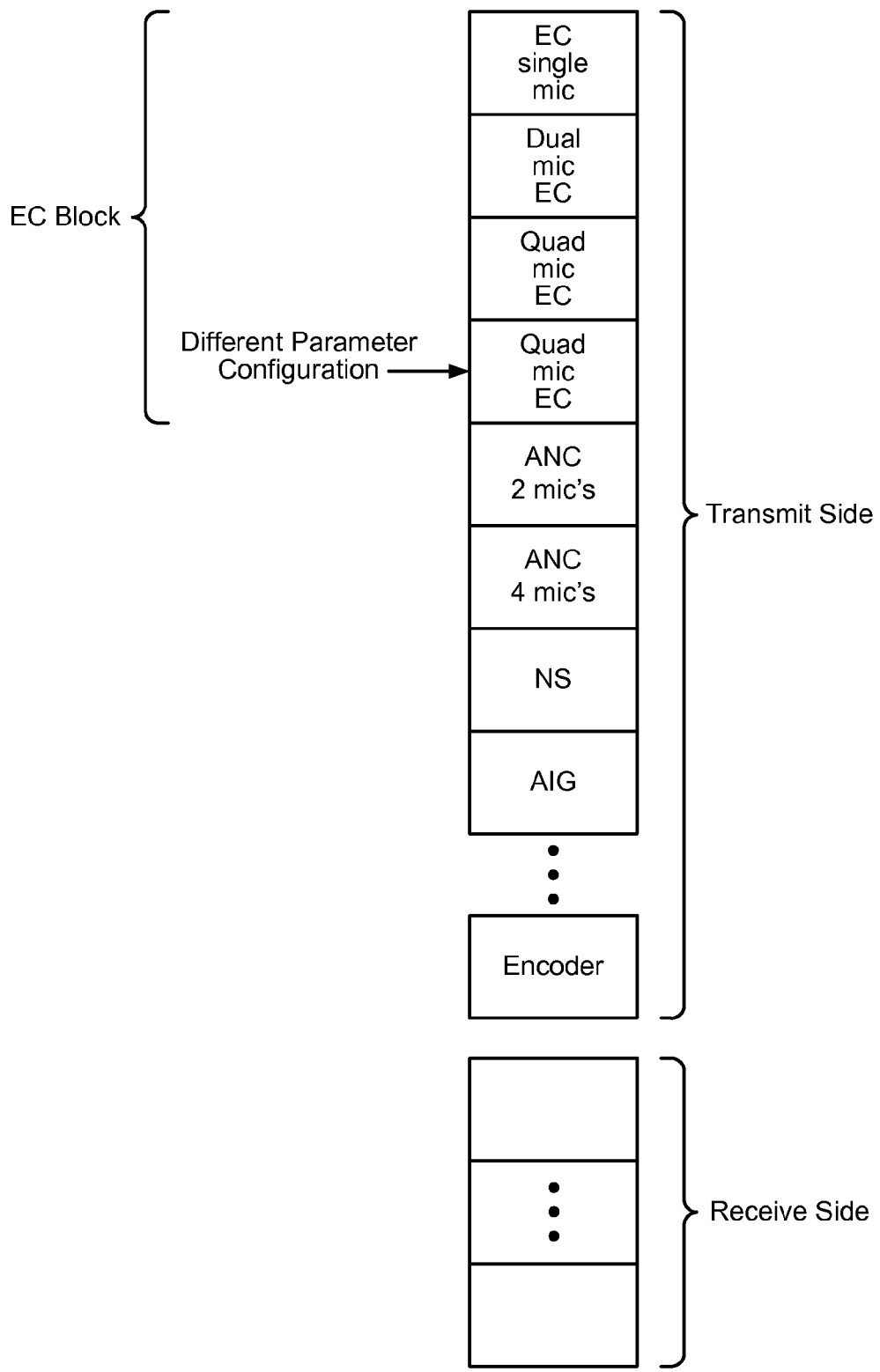
FIGS. 9-12 are conceptual diagrams illustrating example techniques for loading images in accordance with this disclosure.

FIGS. 9-12 are conceptual diagrams illustrating example techniques for loading images in accordance with this disclosure. FIG. 9 illustrates a superset image loading technique. In some examples, when using the superset image loading technique, one image may be loaded per DSP algorithm. In further examples, when using the superset image loading technique, one image may have all topologies.

As shown in FIG. 9, the superset image may include a transmit side image and a receive side image. The transmit side image may include (from top-to-bottom) a single microphone EC audio processing algorithm, a dual microphone EC audio processing algorithm, a quad microphone EC audio processing algorithm with a first parameter configuration, a quad microphone EC audio processing algorithm with a second parameter configuration, a two microphone ANC audio processing algorithm, a quad microphone ANC audio processing algorithm, an NS audio processing algorithm, an AIG audio processing algorithm, and an encoder audio processing algorithm. The four EC audio processing algorithms may form an EC block. The receive side may contain one or more receive side audio processing algorithms such as, e.g., a MBDRC audio processing algorithm, a PBE audio processing algorithm, a limiter audio processing algorithm, a speaker protection audio processing algorithm, and a decoder processing algorithm.

In some examples, the superset image loading technique may load, as one or more aggregate images, all algorithms that may be needed for the various combinations of devices and functionalities that will be used in an audio communications device. In some cases, a single aggregate image may include all algorithms for both transmit side and receive side. In additional cases, an aggregate image for the transmit side and an aggregate image for the receive side may be separately loaded.

Figure 10:
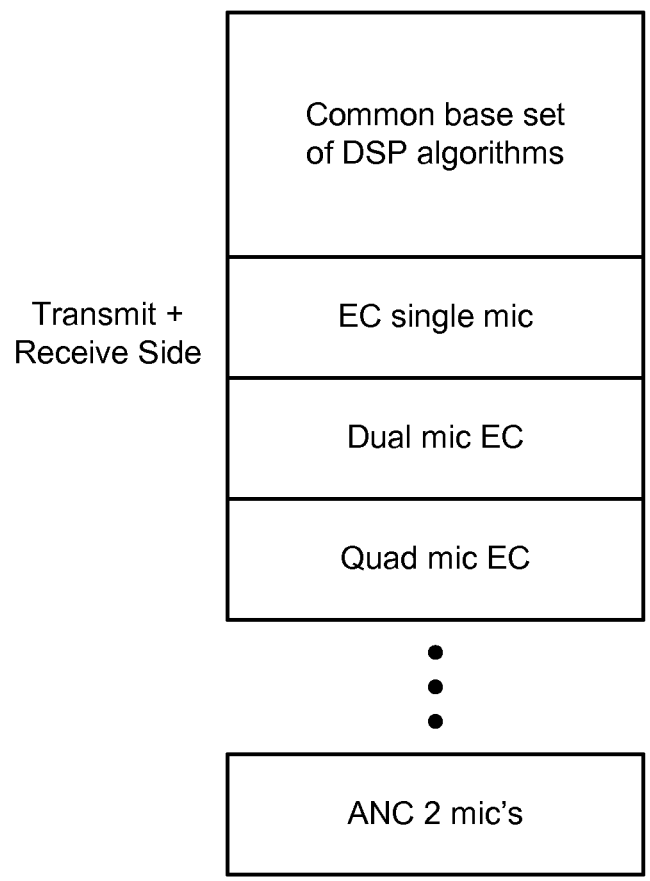

FIG. 10 illustrates a minimum set of images image loading technique. In some cases, the minimum set of images image loading technique may include loading, as a single image, a common base set of DSP algorithms that are used for both the transmit side and the receive side. In additional cases, the minimum set of images image loading technique may include loading two different common base sets of DSP algorithms using two different images. For example, a first common base set of DSP algorithms that are used for the transmit side may be loaded as a single image and a second common base set of DSP algorithms that are used for the receive side may be loaded as a single image. In either case, any DSP algorithms that are not part of the common base sets of DSP algorithms may be loaded as one or more separate images.

As shown in FIG. 10, the loaded image set may include (from top-to-bottom) a common base set of DSP algorithms for both the transmit side and the receive side, a single microphone EC algorithm, a dual microphone EC algorithm, a quad microphone EC algorithm, one or more additional algorithms (unidentified), and a dual microphone ANC algorithm.

Figure 11:
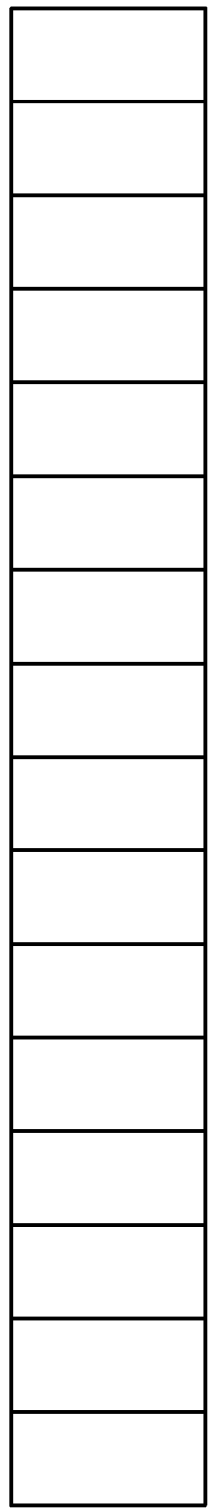

FIG. 11 illustrates an algorithm-specific image loading technique. As shown in FIG. 11, each DSP algorithm may have its own image. In other words, each DSP algorithm may be loaded as a separate image. In some examples, each image may be a topology.

Figure 12:
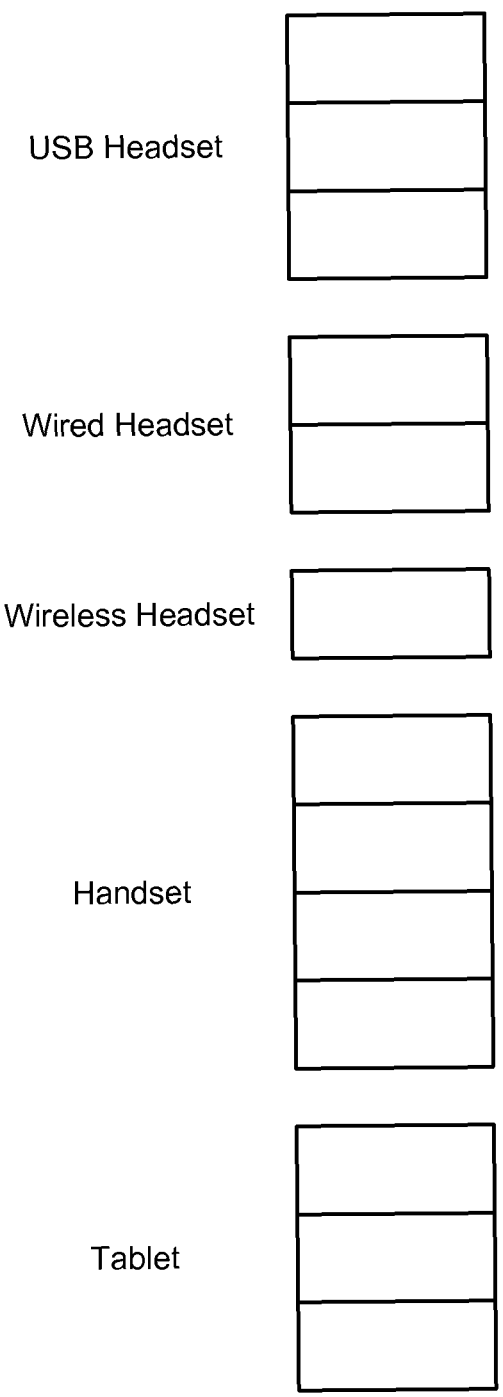

FIG. 12 illustrates a device-specific image loading technique. As shown in FIG. 12, each image may be associated with a particular device, and may include one or more DSP algorithms. If the device-specific image loading technique is used, one or more images may be loaded based on the current device that is selected to be used during a communication session. As shown in FIG. 12, the different images may include (from top-to-bottom) a USB headset image, a wired headset image, a wireless headset image, a handset image, and a tablet image.

Figure 13:
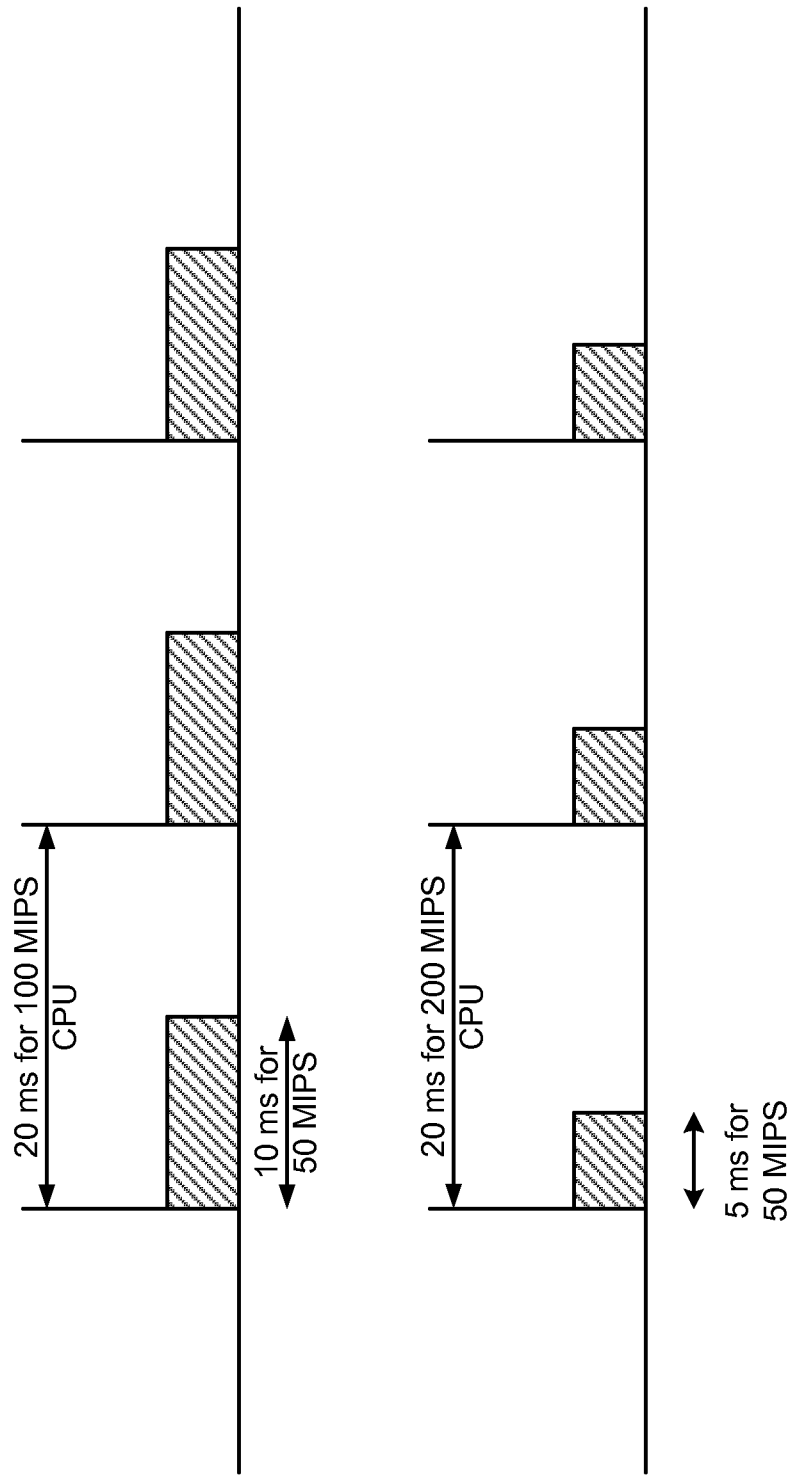
FIG. 13 is a timing diagram illustrating example concepts regarding processing budgets, processing requirements, and frame sizes in accordance with this disclosure.

FIG. 13 is a timing diagram illustrating example concepts regarding processing budgets, processing requirements, and frame sizes in accordance with this disclosure. MIPS is an acronym for Millions of Instructions per Second. This is a commonly used metric to describe the processing requirements on a DSP processor. The total MIPS of a DSP is dependent on the clock speed of the DSP. For example, if a DSP is running at a 100 Megahertz (MHz) clock and each clock executes one instruction, the DSP MIPS availability is 100 MIPS. If an algorithm requires 50 MIPS for processing, the algorithm may take up 50% of the CPU time.

The frame size in the examples shown in FIG. 13 is 20 ms. The top portion of FIG. 13 illustrates that, for a CPU with a processing budget of 100 MIPS, an audio processing algorithm that has a 50 MIPS processing requirement may take up one-half of a 20 ms frame or 10 ms. The bottom portion of FIG. 13 illustrates that, for a CPU with a processing budget of 200 MIPS, an audio processing algorithm that has a 50 MIPS processing requirement may take up one-quarter of a 20 ms frame or 15 ms. In some examples, the CPU may correspond to a DSP.

Figure 14:
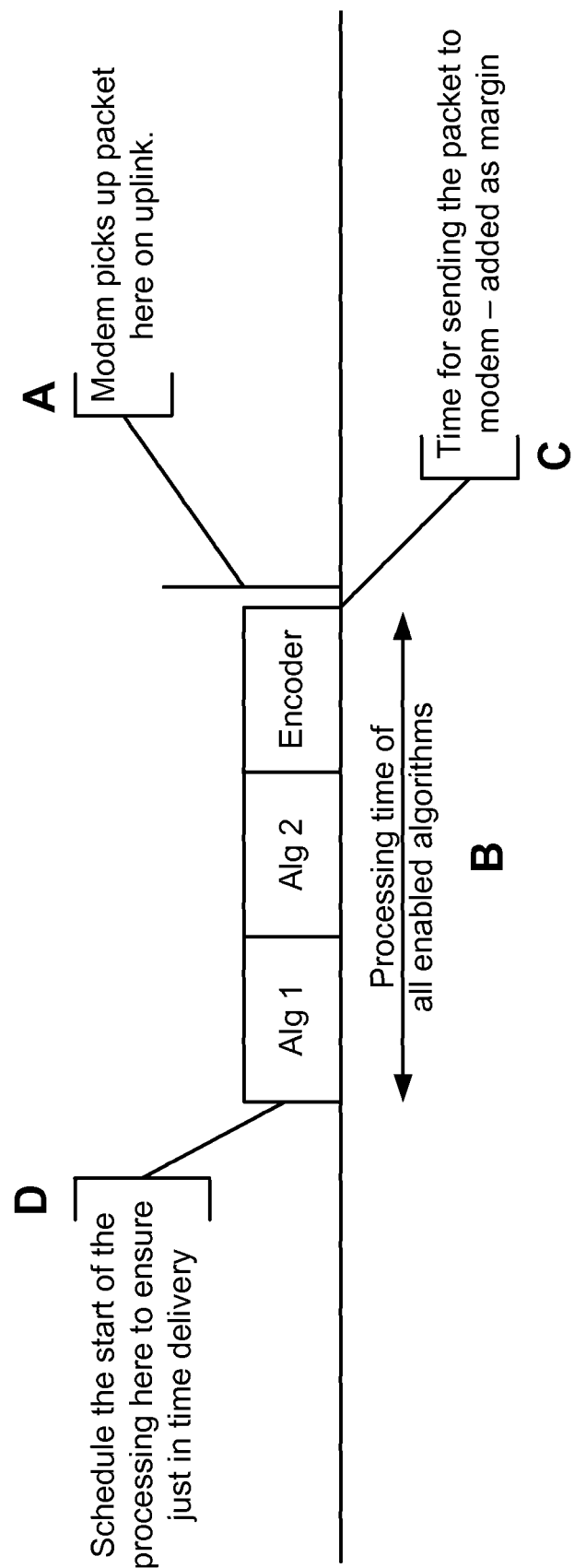
FIG. 14 is a timing diagram illustrating example just-in-time scheduling concepts in accordance with this disclosure.

FIG. 14 is a timing diagram illustrating example just-in-time scheduling concepts in accordance with this disclosure. At time point A, the modem picks up a packet for delivery. Therefore, a packet for transmission may need to be ready by time point A. Time period B represents the processing time for all enabled algorithms in a topology. The time period C is the time period between the ending of the processing of the enabled algorithms and the time point A. Time period C represents the time for sending the packet to the modem, and may be added as margin. Time point D represents the time at which the processing is scheduled to begin to ensure just in time delivery.

A best RTD may be achieved, in some examples, if the packets or samples are sent downstream just-in-time. For the uplink, this may done by identifying the time when the modem picks up the packet (A) and then subtracting the time it takes for the DSP to do its processing (B) and subtracting transfer latency to the modem (C) to arrive at a time to schedule the start of processing for the topology (D). For the downlink, a similar analysis may be done to deliver the samples to the audio codec.

Figure 15:
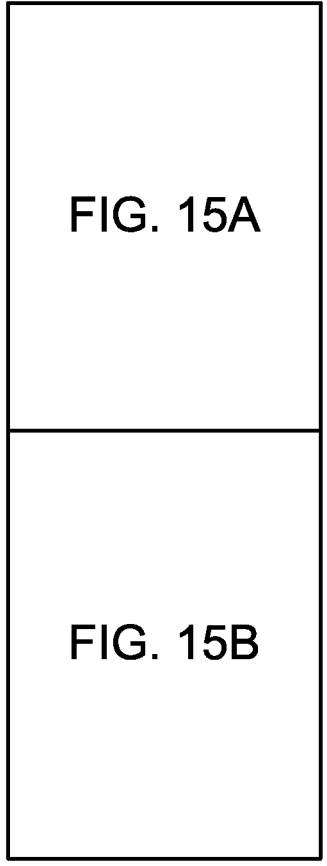
FIGS. 15A-B ("FIG. 15") are flow charts illustrating an example technique to control the execution speed of a processor in accordance with this disclosure.

FIG. 15 is a flow chart illustrating an example technique to control the execution speed of a processor in accordance with this disclosure. The technique shown in FIG. 15 is described as being performed by voice processing manager 66 of DSP 54 shown in FIG. 8 for exemplary purposes. In other examples, the technique illustrated in FIG. 15 may be implemented in one or more other components in addition to or in lieu of voice processing manager 66. The one or more other components may be located in DSP 54, in application processor 52, another processor, or any combination thereof. In addition, the technique illustrated in FIG. 15 may be implemented in systems that have same or different components in the same or a different configuration.

Voice processing manager 66 may initiate performance of the processor execution speed control technique shown in FIG. 15 in response to a dynamic or static (processing chain) object being loaded (100). Once the technique has been initiated, voice processing manager 66 may initialize a running total of MIPS processing requirements to zero (alternatively referred to as a running total processing delay parameter) and initialize a running total of algorithm delay requirements to zero (alternatively referred to as a running total algorithm delay parameter) (102).

Voice processing manager 66 may determine whether all algorithms in a topology have been accounted for (e.g., whether all algorithms have been queried to obtain delay parameters and added to the running totals) (104). In response to determining that all algorithms have not been accounted for, voice processing manager 66 may increment an algorithm block number (n) (106).

Voice processing manager 66 may determine whether the algorithm corresponding to the algorithm block number is enabled (108). In response to determining that the algorithm corresponding to the algorithm block number is not enabled, voice processing manager 66 may return to decision block 104 to determine if any other algorithms need to be included in the running totals for the MIPS processing requirement and the algorithm delay.

In response to determining that the algorithm corresponding to the algorithm block number is enabled, voice processing manager 66 may get processing and algorithm delay requirements (Mn/An) from the block that executes the algorithm (110). In other words, voice processing manager 66 may query a task that is executing the algorithm to get or obtain a parameter indicative of the processing delay of the algorithm (Mn), and to get or obtain a parameter indicative of the algorithm delay of the algorithm (An). In some examples, when voice processing manager 66 queries the task, voice processing manager 66 may cause the task to perform some or all of the technique illustrated in FIG. 16.

Voice processing manager 66 may add the obtained processing delay parameter (Mn) to the running total of processing delay parameters (M) to obtain a new running total processing delay parameter, and add the obtained algorithm delay parameter (An) to the running total of processing delay parameters (A) to obtain a new running total algorithm delay parameter (112). In some examples, voice processing manager 66 may use the following equations to update the running totals: (1) M=M+Mn; and (2) A=A+An where Mn and An represent the processing delay and algorithm delay parameters, respectively, for the currently processed algorithm; the right-hand side M and A parameters represent the running total processing delay and the running total algorithm delay, respectively, prior to the update; and the left-hand side M and A parameters represent the running total processing delay and the running total algorithm delay, respectively, after the update.

After performing the update, voice processing manager 66 returns to decision block 104 to determine if any additional algorithms need to be accounted for. Voice processing manager 66 may process any additional algorithms using blocks 106, 108, 110 and 112 until all algorithms have been processed.

In response to determining that all algorithms have been accounted for or processed, voice processing manager 66 adds margin for system overheads and/or known delays to the running totals for the algorithm delay and processing delay (114). In some examples, voice processing manager 66 may use the following equations to add the overhead margins and/or known delay margins: (1) Mf=M+Mmargin; and (2) Af=A+Amargin where Mmargin represents the system processing overhead margin and/or known processing delay margin; Amargin represents the system algorithm overhead margin and/or known algorithm delay margin; the right-hand side M and A parameters represent the running total processing delay and the running total algorithm delay, respectively; and Mf and Af represent the running total processing delay and the running total algorithm delay, respectively, after the overhead margins and known delay margins have been added.

Voice processing manager 66 may reset the clock requirements for DSP 54 to the lowest power level (e.g., the slowest clock) and estimate Round Trip Delay (RTD) behavior (116). In other words, voice processing manager 66 may select a candidate processor execution speed. In some cases, voice processing manager 66 may select a lowest possible clock rate for a processor that is configured to execute the one or more audio processing algorithms.

Voice processing manager 66 may estimate the RTD based on Mf and Af (118). For example, voice processing manager 66 may determine the estimated RTD based on the following equation: RTD=Mf+Af, where Mf and Af represent the running total processing delay and the running total algorithm delay, respectively.

The estimated RTD may correspond to the RTD of the processing chain. In some examples, there are other components external to the processing chain that may affect the total RTD, e.g., the Modem SW delay. These components may be fixed and independent of the device calibration.

In some examples, the RTD may be referred to as a total processing delay for the transmitter side and the receiver side.

In addition to or lieu of estimating the RTD in process block 118, voice processing manager 66 may estimate a total processing delay other than a RTD. For example, voice processing manager 66 may estimate a total processing delay for the transmitter side audio processing algorithms or a total processing delay for the receiver side audio processing algorithms. In such examples, voice processing manager 66 may use the alternate total processing delay in place of the RTD in the remaining steps of the technique shown in FIG. 15.

Voice processing manager 66 may determine whether the RTD meets a specification (120). For example, voice processing manager 66 may determine if the RTD is less than or equal to a threshold RTD. The threshold RTD may be determined based on, for example, actual a-priori measurements on the target phone for a representative use case. In response to determining that the RTD is less than or equal to the threshold RTD (i.e., that the RTD meets the specification), voice processing manager 66 may allow the clock to remain at the current clock level (122) because that clock level may provide the lowest power consumption for that particular RTD. Voice processing manager 66 may cease execution of the processor execution speed algorithm (124).

In response to determining that the RTD is not less than or equal to the threshold RTD (i.e., that the RTD does not meet the specification), voice processing manager 66 may increase the clock requirements (e.g., clock rate) to the next power level and recomputed the RTD behavior for the next clock (126). Increasing the clock requirements to the next power level may involve selecting a subsequent candidate processor execution speed.

Voice processing manager 66 may determine whether the new clock rate is greater than the maximum clock rate (128). In response to determining that the new clock rate is not greater than the maximum clock rate, voice processing manager 66 may return to decision block 120 to determine whether the new RTD meets the specification. In response to determining that the new clock rate is greater than the maximum clock rate, voice processing manager 66 may set the clock to a maximum clock rate, flag an error (e.g., output an error flag) (130), and cease execution of the processor execution speed control algorithm (132).

In some examples, in addition to or in lieu of determining whether the RTD meets a specification in decision block 120, voice processing manager 66 may determine whether an estimated total processing delay for the candidate processor execution speed is less than a maximum communication delay for a communication session. In some examples, the maximum communication delay for the communication session may be a maximum round trip delay for the communication session, a maximum transmitter side delay for the communication session, or a maximum receive side delay for the communication session.

Figure 15A:
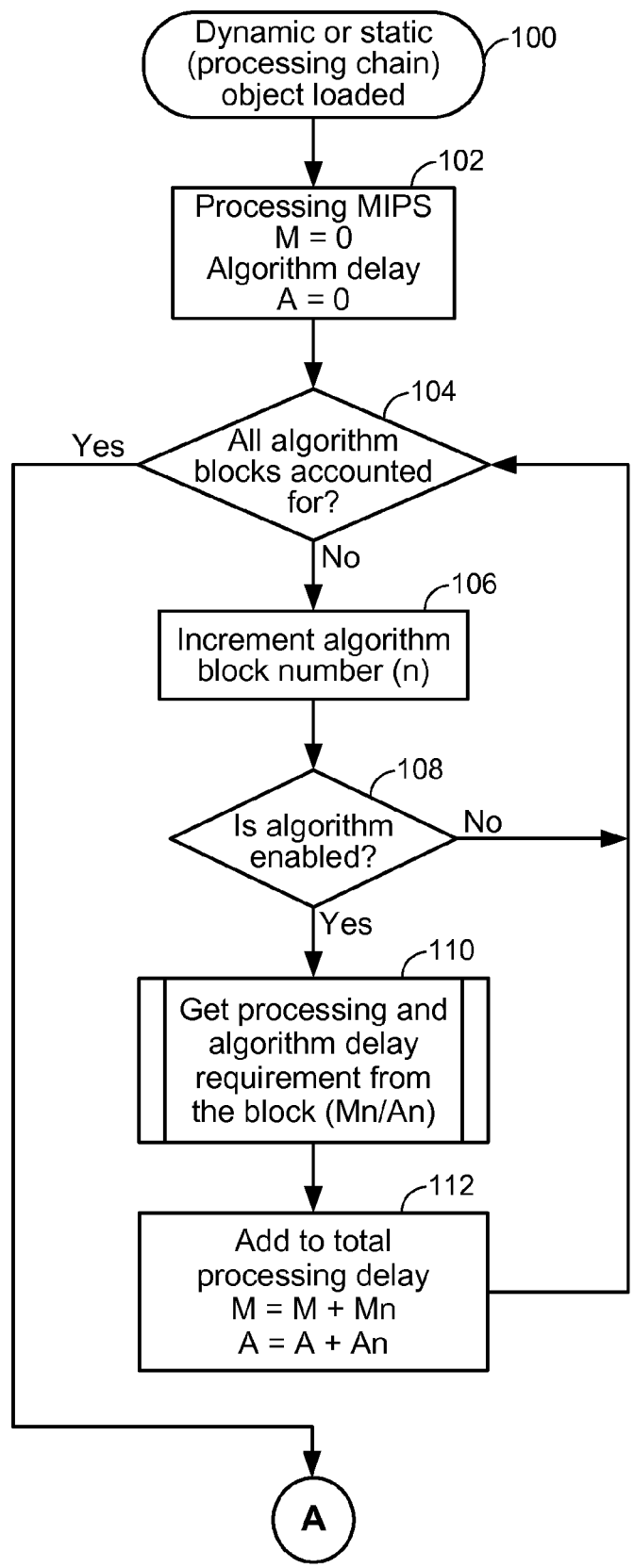
Figure 15B:
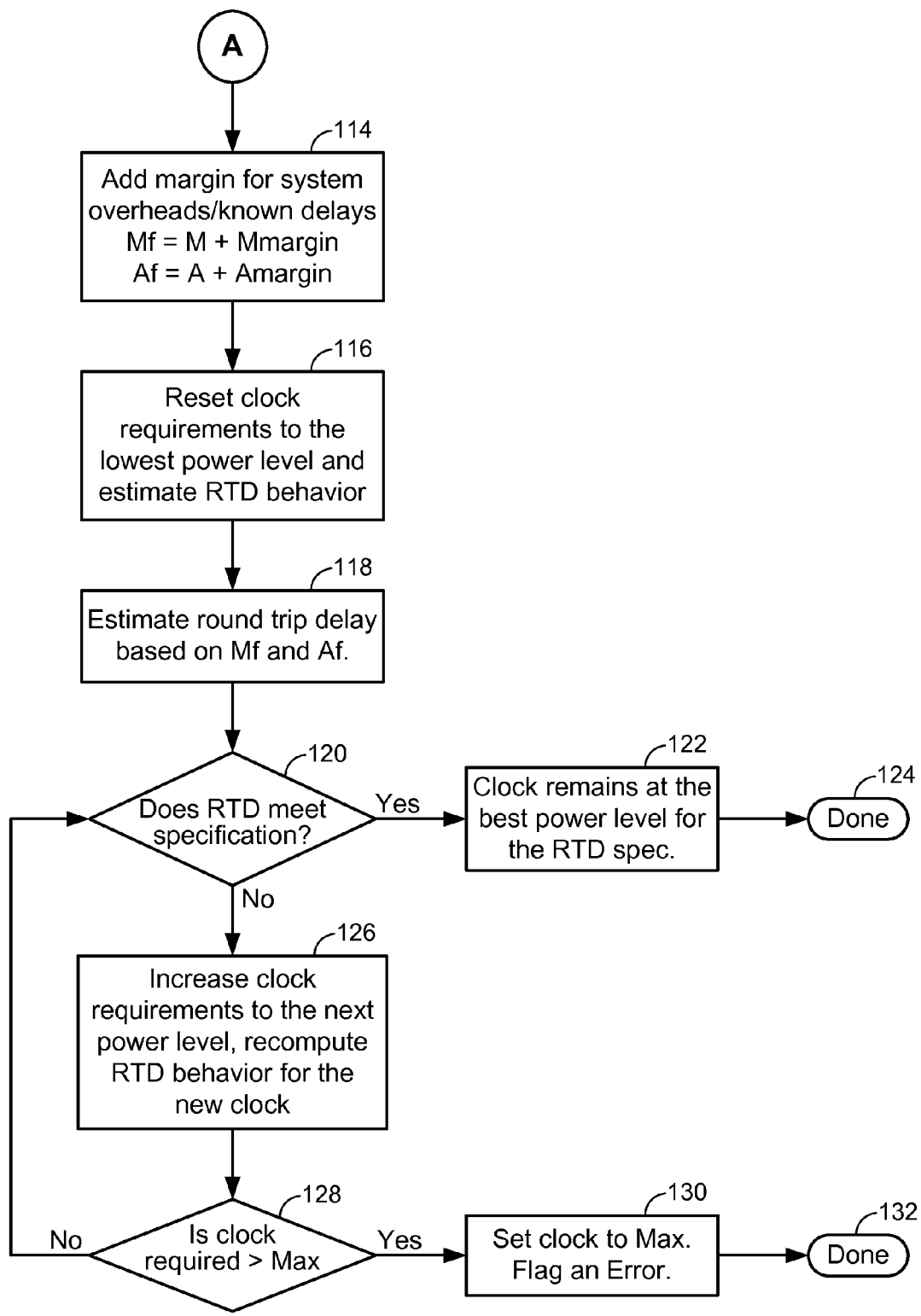

In the example technique shown in FIGS. 15A and 15B, the algorithm delay parameter may be alternatively referred to as an algorithmic delay parameter. Similarly, the algorithm delay may be alternatively referred to as the algorithmic delay.

Figure 16:
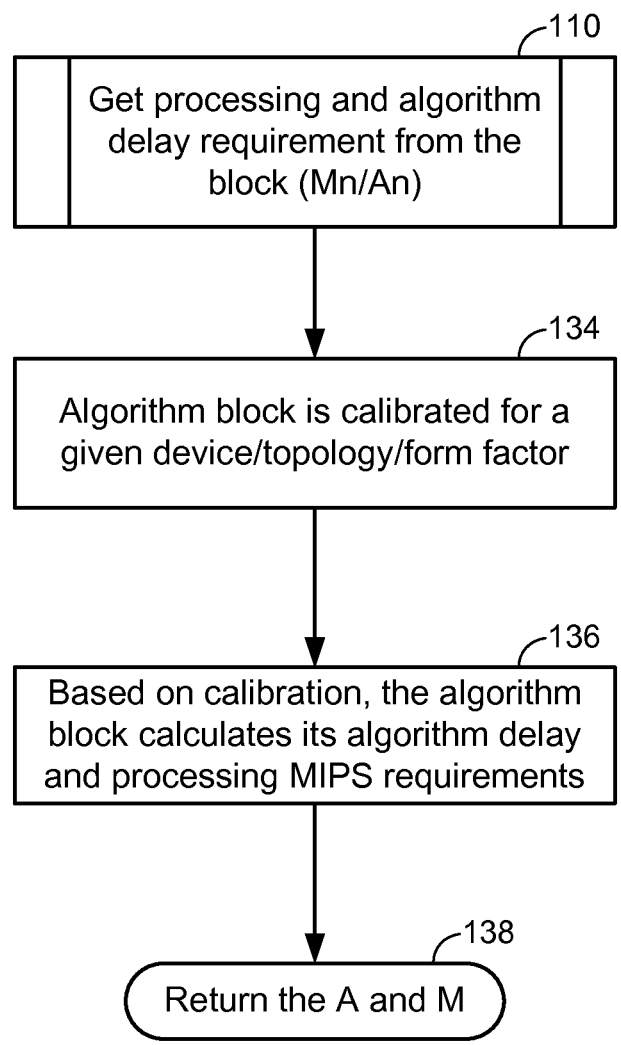
FIG. 16 is a flow chart illustrating an example technique for obtaining one or more delay parameters from a task that executes one or more audio processing algorithms in accordance with this disclosure.

FIG. 16 is a flow chart illustrating an example technique for obtaining one or more delay parameters from a task that executes one or more audio processing algorithms in accordance with this disclosure. The technique shown in FIG. 16 is described as being performed using audio processing system 50 shown in FIG. 8 for exemplary purposes. In other examples, the technique illustrated in FIG. 16 may be implemented in systems that have same or different components in the same or a different configuration.

Voice processing manager 66 may initiate performance of the technique shown in FIG. 16 by issuing one or more queries to task 68 (110). Once the technique has been initiated, voice processing manager 66 may calibrate the task for a given device, topology, and/or form factor (134). Task 68 may determine (e.g., calculate) the algorithm delay and the processing delay (e.g., processing MIPS requirements) based on the calibration parameters and the audio processing algorithm executed by task 68 (136). Task 68 may return the algorithm delay (A) and the processing delay (M) (138).

This disclosure describes techniques for dynamic loading with automatic system timing adjustments. Two-way communication is often adversely affected by End-to-End delay in a communication channel. One metric to quantify this delay in the handset (e.g. User Equipment or UE) is the Round Trip Delay (RTD), which may be defined to be the sum of the time required for speech picked up at the microphone of the UE to reach the antennae on the uplink and the time required for the downlink signal picked up by the antennae to render on the earpiece. The UE design may take RTD into account, and any processing in the voice path may be done in a way which minimizes RTD. Hence, techniques which employ "just in time" processing may be used to reduce and/or minimize RTD. Audio and voice processing chipset solutions may employ Digital Signal Processor(s) (DSP) to process the sampled speech in order to transmit the data over the air. This processing may be done utilizing a sequence of algorithms which execute in succession on the sampled speech. To reduce or minimize RTD, each algorithm may be designed to complete "just in time" so the subsequent algorithm may operate on the most recent data and process it as soon as it is available. Such "just in time" processing may require, in some cases, a good understanding of the processing requirements for each algorithm, measured in million instructions per second (MIPS), so that the time required to complete each algorithm may be known and the end-to-end processing may complete in the minimum required time.

Traditionally, in order to ensure "just in time" processing, the algorithms running sequentially on a voice DSP were configured during the development phase such that they run one right after the other in a very carefully tuned, tightly timed system. This tuning was typically done only after careful system analysis to ensure timing requirements were not violated by MIPS overruns, etc.

The techniques of this disclosure may monitor MIPS usage for each algorithm, at runtime, and report this usage to a system monitoring algorithm. This system monitoring algorithm in turn may, in some examples, adjust the timing of each algorithm which needs to run such that the algorithms complete just in time. This may result, in some examples, in minimum and/or reduced RTD and hence optimal and/or improved system performance. Furthermore, this performance may be obtained, in some examples, by making dynamic adjustments at runtime and without the need for detailed, time-consuming a priori system analysis. This techniques of this disclosure may not only provide optimal and/or improved system RTD performance, in some examples, but the techniques of this disclosure may do so without the time-consuming a priori analysis that occurs in traditional system. In some examples, the techniques of this disclosure may allow a voice topology (e.g. the combination of sequential algorithms) to be changed dynamically without having to manually re-adjust the system timing. For example, the system monitor may do this automatically with the topology change. Furthermore, the techniques of this disclosure may, in some examples, recognize when a DSP requires additional MIPS and provide a mechanism to increase the DSP clock frequency accordingly. Likewise, should the DSP not require all available MIPS, the techniques of this disclosure may, in some examples, recognize the MIPS surplus and to reduce the DSP clock accordingly.

In some types of audio communication devices, multiple different topologies may be used or available for use. For example, for cell phones, there are often many possible audio devices. Some of the commonly used devices include, e.g., a Handset device, a Speaker Phone device, a Bluetooth device, and a Headset device. The audio signal characteristics may be different for each of these devices. The reason for differences may be, for example, a combination of one or more of component characteristics, usage by user, holding pattern, latencies, gains, temperature, ambient noise response, echo feedback, phone/tablet form factor and so on. Due to these differences, each device may, in some examples, need its own set of algorithms (represented by a topology) and audio calibration.

Currently, the worst case MIPS for an anticipated set of algorithms per topology is pre-computed. Because a voice call may be a power sensitive feature, it may not be beneficial to always run the CPU at a maximum clock frequency. In general, the lower the clock rate that CPU runs at, the lower the CPU power consumption. Therefore, a careful analysis of the power, the CPU clock rate, RTD, scheduling calculation are often manually performed and programmed.

In addition to the complexity involved in the above-described manual analysis, this approach has two major short comings. First, even if the real calibration for a particular form factor needs only a small subset of the algorithms, the manual approach may increase RTD and increase power consumption because the CPU clock may be overestimated. Moreover, dynamically loaded modules may have to take into account these system settings and all the developers of these modules may need to do a similar manual analysis in a system. This adds to the complexity of their module design. For example, developers may need to understand about the end-to-end requirements and do a similar in-depth analysis and requirements instead of focusing on their subset of topologies.

In some examples, the techniques of this disclosure may involve scheduling the algorithms in a topology in a manner that solves one or both of the above-mentioned shortcomings in an automated fashion. In some examples, each of the algorithm modules may be self-contained and self describing without requiring the developer to understand the end-to-end system requirements. The developer may ensure that, based on the calibration of the module developed, the algorithm may calculate or determine its algorithm delay and processing MIPS.

Each time a new topology is loaded or required, the scheduler (e.g., voice processing manager 66) may iterate over each of the enabled algorithm modules and determine (e.g., calculate) the total MIPS and total algorithm delays. Once the scheduler has this data for all algorithms, the scheduler may start with the lowest clock and estimate the RTD at this clock. The estimated RTD may be compared against a threshold to determine whether it satisfies requirements within an acceptable deviation. If not, the scheduler may make the same determination for the next CPU clock (equivalently power level) until the maximum clock rate is reached. The scheduler may auto schedule the start of the topology execution so that the data is ready just-in-time to be sent downstream.

In some examples, during the course of development and testing, it may possible that the MIPS provided by the modules are insufficient for the maximum CPU clock rate. In systems that are hard real time systems, this usually signifies an erroneous condition. The topology and calibration may be pre-tested before releasing to end user, setting the clock to max and flagging an error will indicate to the tester that something is not as expected.

If the high MIPS is due to erroneous reporting by the module, but the actual MIPS are ok, the topology may work as expected in the rare field conditions. Note that calibration and topology may be tightly controlled entities in these hard real time systems and the scheduling algorithm may, in some cases, be applicable only to these scenarios. The calibration and topology may be downloaded by end-user, but not necessarily. In cases were the calibration and topology are downloaded by the end-user, running out of MIPS may be a side effect of an overloaded system, and the behavior may become jittery with frame drops. Examples where this may occur include using high definition (HD) video playback on a weak CPU or a PC game that is run on a low end graphics card that does not support the resolution (e.g., causes the video or game to be jittery).

In some examples, the DSP algorithms may be multi-threaded, and the techniques of this disclosure may adjust the processor execution speed based on the number of threads that are capable of executing in parallel on the DSP. In some examples, each DSP algorithm may have an algorithm delay and a processing delay.

In some examples, the processing delay for a particular audio processing algorithm may be defined by the following equation:

$$\text{Processing Delay} = \frac{MIPS}{\text{clock rate}}$$

where MIPS are the processing requirement of the audio processing algorithm in millions of instructions per second, clock rate is the rate at which the DSP is clocked.

In some examples, the algorithm delay and the MIPS delay for an algorithm may be linearly related. For example, as the algorithm delay increases, the MIPS delay may also increase. As another example, as the MIPS delay increases, the algorithm delay may also increase.

In one example, a 64 tap filter audio processing algorithm and a 256 tap filter audio processing algorithm may be selectively used to process audio waveforms. In this example, the 64 tap filter may have an 8 ms algorithm delay and a 1 MIP processing delay, and the 256 tap filter may have a 32 ms algorithm delay and 4 MIPS processing delay. These numbers are provided merely for exemplary purposes. In other examples, such filters may exhibit other algorithm and processing delays.

In some examples, images and/or objects to be loaded into memory may be selected based on which audio device is selected. In some examples, a voice call may go, by default, to a handset mode on startup until a speaker phone is selected (for example). In some examples, the final OEM/HLOS implementation may perform the selection. In some examples, the topology information and calibration information is selected during a call based on the device. In such examples, such information may be mapped in the software during production.

In some examples, image/object selection may be performed manually. In further examples, if the algorithm & MIPS exceed requirements, a voice processing manager may swap in another image/object (e.g., dynamic image swapping). In other examples, running out of MIPs may be result in an error condition. In some examples, a scheduling algorithm takes care whether or not the images or objects are dynamically loaded.

Example algorithms where MIPS measurements may be made include, e.g., tuning filters, dynamic range control, automatic volume control, bass enhancement, high pass filters, re-samplers, multi microphone EC, etc.

Although the techniques of this disclosure are primarily described with respect to audio processing, in some examples, the techniques of this disclosure may also be applied to video processing and/or to combined audio-video processing.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium (e.g., a non-transitory computer-readable storage medium) such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method comprising:
   determining, with one or more processors, a processor execution speed for executing one or more audio processing algorithms of a topology based on one or more algorithm-specific parameter values, the one or more audio processing algorithms being configured according to the one or more algorithm-specific parameter values, at least in part by:
   selecting, with the one or more processors, a candidate processor execution speed;
   estimating, with the one or more processors, a total processing delay for the one or more audio processing algorithms based on the candidate processor execution speed;
   determining, with the one or more processors, whether the estimated total processing delay for the candidate processor execution speed is less than a maximum communication delay for a communication session; and
   selecting, with the one or more processors, a subsequent candidate processor execution speed and estimating a total processing delay for the subsequent candidate processor execution speed in response to determining that the estimated total processing delay for the candidate processor execution speed is not less than the maximum communication delay for the communication session; and
   executing, with the one or more processors, the one or more audio processing algorithms of the topology based on the subsequent candidate processor execution speed.

2. The method of claim 1, wherein the one or more processing algorithms comprise a sequence of one or more audio processing algorithms.

3. The method of claim 1, wherein
   estimating the total processing delay for the one or more audio processing algorithms is further based on the one or more algorithm-specific parameter values.

4. The method of claim 1, wherein
   estimating, with the one or more processors, the total processing delay for the one or more audio processing algorithms is further based on one or more delay parameters provided by one or more processing tasks that execute the one or more audio processing algorithms, the one or more delay parameters being determined based on the one or more algorithm-specific parameter values.

5. The method of claim 4, wherein estimating the total processing delay for the one or more audio processing algorithms comprises:
   for each of the audio processing algorithms, querying a task that executes the respective audio processing algorithm to obtain the one or more delay parameters.

6. The method of claim 1, wherein determining the processor execution speed for executing the one or more audio processing algorithms further comprises:
   selecting the candidate processor execution speed as the processor execution speed in response to determining that the estimated total processing delay for the candidate processor execution speed is less than the maximum communication delay for the communication session.

7. The method of claim 1, wherein selecting the candidate processor execution speed comprises:
   selecting, with the one or more processors, a lowest possible clock rate for a processor that is configured to execute the one or more audio processing algorithms.

8. The method of claim 1, wherein the subsequent candidate processor execution speed is greater than the candidate processor execution speed.

9. The method of claim 1, wherein the maximum communication delay for the communication session is at least one of a maximum round trip delay for the communication session, a maximum transmitter side delay for the communication session, and a maximum receive side delay for the communication session.

10. The method of claim 1, wherein estimating the total processing delay for the one or more audio processing algorithms comprises:
    for each of the audio processing algorithms, querying, with the one or more processors, a task that executes the respective audio processing algorithm to obtain one or more parameters indicative of one or more delays associated with executing the respective audio processing algorithm; and
    estimating, with the one or more processors, the total processing delay based on the one or more parameters obtained for each of the one or more audio processing algorithms and based on the candidate processor execution speed.

11. The method of claim 10, wherein the one or more parameters indicative of one or more delays associated with executing the respective audio processing algorithm comprise:
    a parameter indicative of an algorithm delay associated with executing the respective audio processing algorithm; and
    a parameter indicative of a processing delay associated with executing the respective audio processing algorithm.

12. The method of claim 11, wherein estimating the total processing delay based on the one or more parameters obtained for each of the one or more audio processing algorithms comprises:
    initializing a running total processing delay parameter to zero;
    initializing a running total algorithm delay parameter to zero;
    for each of the audio processing algorithms, adding the parameter indicative of the processing delay associated with executing the respective audio processing algorithm to the running total processing delay parameter;
    for each of the audio processing algorithms, adding a parameter indicative of the algorithm delay associated with executing the respective audio processing algorithm to the running total algorithm delay parameter;
    adding a system processing overhead margin to the running total processing delay parameter;
    adding a system algorithm overhead margin to the running total algorithm delay parameter; and
    estimating the total processing delay based on the running total processing delay parameter, the running total algorithm delay parameter, and the candidate processor execution speed.

13. The method of claim 1, wherein determining the processor execution speed for executing the one or more audio processing algorithms further comprises:
    determining the processor execution speed for executing the one or more audio processing algorithms based on one or more delay parameters provided by one or more processing tasks that execute the one or more audio processing algorithms.

14. The method of claim 1, further comprising:
loading the topology onto the one or more processors for execution.

15. The method of claim 1, wherein determining, with the one or more processors, the processor execution speed comprises:
determining, with the one or more processors, the processor execution speed based on information indicative of whether the one or more of the audio processing algorithms in the topology are enabled or disabled for the topology.

16. The method of claim 1, wherein determining, with the one or more processors, the processor execution speed further comprises:
determining, with the one or more processors, the processor execution speed based on one or more parameters indicative of a configuration for the one or more of the audio processing algorithms in the topology.

17. A device comprising:
a memory configured to store data for audio processing; and
one or more processors configured to:
determine a processor execution speed for executing one or more audio processing algorithms of a topology based on one or more algorithm-specific parameter values, the one or more audio processing algorithms being configured according to the one or more algorithm-specific parameter values, wherein, to determine the processor execution speed, the one or more processors are configured to:
select a candidate processor execution speed;
estimate a total processing delay for the one or more audio processing algorithms based on the candidate processor execution speed;
determine whether the estimated total processing delay for the candidate processor execution speed is less than a maximum communication delay for a communication session; and
select a subsequent candidate processor execution speed and estimate a total processing delay for the subsequent candidate processor execution speed in response to a determination that the estimated total processing delay for the candidate processor execution speed is not less than the maximum communication delay for the communication session; and
execute the one or more audio processing algorithms of the topology based on the subsequent candidate processor execution speed.

18. The device of claim 17, wherein the one or more processing algorithms comprise a sequence of one or more audio processing algorithms.

19. The device of claim 17, wherein, to
estimate the total processing delay for the one or more audio processing algorithms, the one or more processors are configured to estimate the total processing delay based on the one or more algorithm-specific parameter values.

20. The device of claim 17, wherein, to estimate the total processing delay, the one or more processors are configured to estimate the total processing delay for the one or more audio processing algorithms based on one or more delay parameters provided by one or more processing tasks that execute the one or more audio processing algorithms, the one or more delay parameters being determined based on the one or more algorithm-specific parameter values.

21. The device of claim 20, wherein the one or more processors are further configured to, for each of the audio processing algorithms, query a task that executes the respective audio processing algorithm to obtain the one or more delay parameters.

22. The device of claim 17, wherein, to determine the processor execution seed for executing the one or more audio processing algorithms, the one or more processors are further configured to:
select the candidate processor execution speed as the processor execution speed in response to determining that the estimated total processing delay for the candidate processor execution speed is less than the maximum communication delay for the communication session.

23. The device of claim 17, wherein the one or more processors are further configured to select a lowest possible clock rate for a processor that is configured to execute the one or more audio processing algorithms.

24. The device of claim 17, wherein the subsequent candidate processor execution speed is greater than the candidate processor execution speed.

25. The device of claim 17, wherein the maximum communication delay for the communication session is at least one of a maximum round trip delay for the communication session, a maximum transmitter side delay for the communication session, and a maximum receive side delay for the communication session.

26. The device of claim 17, wherein the one or more processors are further configured to:
for each of the audio processing algorithms, query a task that executes the respective audio processing algorithm to obtain one or more parameters indicative of one or more delays associated with executing the respective audio processing algorithm; and
estimate the total processing delay based on the one or more parameters obtained for each of the one or more audio processing algorithms and based on the candidate processor execution speed.

27. The device of claim 26, wherein the one or more parameters indicative of one or more delays associated with executing the respective audio processing algorithm comprise:
a parameter indicative of an algorithm delay associated with executing the respective audio processing algorithm; and
a parameter indicative of a processing delay associated with executing the respective audio processing algorithm.

28. The device of claim 27, wherein the one or more processors are further configured to:
initialize a running total processing delay parameter to zero;
initialize a running total algorithm delay parameter to zero;
for each of the audio processing algorithms, add the parameter indicative of the processing delay associated with executing the respective audio processing algorithm to the running total processing delay parameter;
for each of the audio processing algorithms, add a parameter indicative of the algorithm delay associated with executing the respective audio processing algorithm to the running total algorithm delay parameter;
add a system processing overhead margin to the running total processing delay parameter;
add a system algorithm overhead margin to the running total algorithm delay parameter; and estimate the total processing delay based on the running total processing delay parameter, the running total algorithm delay parameter, and the candidate processor execution speed.

29. The device of claim 17, wherein, to determine the processor execution speed, the one or more processors are further configured to determine the processor execution speed for executing the one or more audio processing algorithms based on one or more delay parameters provided by one or more processing tasks that execute the one or more audio processing algorithms.

30. The device of claim 17, wherein the one or more processors are further configured to load the topology onto the one or more processors for execution.

31. The device of claim 17, wherein, to determine the processor execution speed, the one or more processors are further configured to determine the processor execution speed based on information indicative of whether the one or more of the audio processing algorithms in the topology are enabled or disabled for the topology.

32. The device of claim 17, wherein, to determine the processor execution speed, the one or more processors are further configured to determine the processor execution speed based on one or more parameters indicative of a configuration for the one or more of the audio processing algorithms in the topology.

33. The device of claim 17, wherein the device comprises a wireless communication device.

34. The device of claim 17, wherein the device comprises a mobile phone handset.

35. An apparatus comprising:
  means for determining a processor execution speed for executing one or more audio processing algorithms of a topology based on one or more algorithm-specific parameter values, the one or more audio processing algorithms being configured according to the one or more algorithm-specific parameter values, the means for determining the processor execution speed further comprising:
    means for selecting a candidate processor execution speed;
    means for estimating a total processing delay for the one or more audio processing algorithms based on the candidate processor execution speed;
    means for determining whether the estimated total processing delay for the candidate processor execution speed is less than a maximum communication delay for a communication session; and
    means for selecting a subsequent candidate processor execution speed and estimating a total processing delay for the subsequent candidate processor execution speed in response to determining that the estimated total processing delay for the candidate processor execution speed is not less than the maximum communication delay for the communication session; and
  means for executing the one or more audio processing algorithms of the topology based on the subsequent candidate processor execution speed.

36. The apparatus of claim 35, wherein the one or more processing algorithms comprise a sequence of one or more audio processing algorithms.

37. The apparatus of claim 35, wherein the means for estimating the total processing delay for the one or more audio processing algorithms comprises means for estimating the total processing delay based on the one or more algorithm-specific parameter values.

38. The apparatus of claim 37, wherein the means for estimating the total processing delay further comprises means for estimating the total processing delay for the one or more audio processing algorithms based on one or more delay parameters provided by one or more processing tasks that execute the one or more audio processing algorithms, the one or more delay parameters being determined based on the one or more algorithm-specific parameter values.

39. The apparatus of claim 38, wherein the means for estimating the total processing delay for the one or more audio processing algorithms further comprises:
  means for querying, for each of the audio processing algorithms, a task that executes the respective audio processing algorithm to obtain the one or more delay parameters.

40. The apparatus of claim 35, wherein the means for determining the processor execution speed for executing the one or more audio processing algorithms further comprises
  means for selecting the candidate processor execution speed as the processor execution speed in response to determining that the estimated total processing delay for the candidate processor execution speed is less than the maximum communication delay for the communication session.

41. A non-transitory computer readable storage medium comprising instructions that upon execution by one or more processors cause the one or more processors to:
  determine a processor execution speed for executing one or more audio processing algorithms of a topology based on one or more algorithm-specific parameter values, the one or more audio processing algorithms being configured according to the one or more algorithm-specific parameter values, wherein the instructions that cause the one or more processors to determine the processor execution speed cause the one or more processors to:
    select a candidate processor execution speed;
    estimate a total processing delay for the one or more audio processing algorithms based on the candidate processor execution speed;
    determine whether the estimated total processing delay for the candidate processor execution speed is less than a maximum communication delay for a communication session; and
    select a subsequent candidate processor execution speed and estimate a total processing delay for the subsequent candidate processor execution speed in response to a determination that the estimated total processing delay for the candidate processor execution speed is not less than the maximum communication delay for the communication session; and
  execute the one or more audio processing algorithms of the topology based on the subsequent candidate processor execution speed.

42. The non-transitory computer readable storage medium of claim 41, wherein the one or more processing algorithms comprise a sequence of one or more audio processing algorithms.

43. The non-transitory computer readable storage medium of claim 41, wherein the instructions that cause the one or more processors to estimate the total processing delay for the one or more audio processing algorithms comprise instructions that cause the one or more processors to estimate the total processing delay for the one or more audio processing algorithms based on the one or more algorithm-specific parameter values.

44. The non-transitory computer readable storage medium of claim 43, wherein the instructions that cause the one or more processors to estimate the total processing delay comprise instructions that cause the one or more processors to estimate the total processing delay for the one or more audio processing algorithms based on one or more delay parameters provided by one or more processing tasks that execute the one or more audio processing algorithms, the one or more delay parameters being determined based on the one or more algorithm-specific parameter values.

45. The non-transitory computer readable storage medium of claim 44, wherein the instructions that cause the one or more processors to estimate the total processing delay comprise instructions that cause the one or more processors to, for each of the audio processing algorithms, query a task that executes the respective audio processing algorithm to obtain the one or more delay parameters.

46. The non-transitory computer readable storage medium of claim 41, wherein the instructions that cause the one or more processors to determine the processor execution speed for executing the one or more audio processing algorithms comprise instructions that cause the one or more processors to
select the candidate processor execution speed as the processor execution speed in response to determining that the estimated total processing delay for the candidate processor execution speed is less than the maximum communication delay for the communication session.

* * * * *